(12) United States Patent
Lin et al.

(10) Patent No.: US 8,417,772 B2
(45) Date of Patent: Apr. 9, 2013

(54) METHOD AND SYSTEM FOR TRANSFERRING CONTENT FROM THE WEB TO MOBILE DEVICES

(75) Inventors: Daniel J. Lin, San Francisco, CA (US); Christopher K. Hess, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/207,234

(22) Filed: Aug. 10, 2011

(65) Prior Publication Data

US 2011/0296315 A1    Dec. 1, 2011

Related U.S. Application Data

(63) Continuation of application No. 11/862,179, filed on Sep. 26, 2007, now Pat. No. 8,024,400, which is a continuation-in-part of application No. 11/674,081, filed on Feb. 12, 2007, now Pat. No. 7,751,807.

(51) Int. Cl.
    *G06F 15/16* (2006.01)
(52) U.S. Cl. .......... 709/203; 709/201; 709/202
(58) Field of Classification Search .......... 709/201–203
    See application file for complete search history.

(56) References Cited

U.S. PATENT DOCUMENTS

| | | | |
|---|---|---|---|
| 4,622,627 A | 11/1986 | Rodriguez et al. | |
| 5,544,305 A | 8/1996 | Ohmaye et al. | |
| 5,566,098 A | 10/1996 | Lucente et al. | |
| 5,623,260 A | 4/1997 | Jones | |
| 5,659,742 A | 8/1997 | Beattie et al. | |
| 5,663,748 A | 9/1997 | Huffman et al. | |
| 5,710,922 A | 1/1998 | Alley et al. | |
| 5,742,905 A | 4/1998 | Pepe et al. | |
| 5,761,485 A | 6/1998 | Munyan | |
| 5,765,168 A | 6/1998 | Burrows | |
| 5,813,017 A | 9/1998 | Morris | |
| 5,845,278 A | 12/1998 | Kirsch et al. | |
| 5,847,698 A | 12/1998 | Reavey et al. | |
| 5,892,900 A | 4/1999 | Ginter et al. | |
| 5,940,846 A | 8/1999 | Akiyama | |
| 5,956,048 A | 9/1999 | Gaston | |
| 5,960,411 A | 9/1999 | Hartman et al. | |
| 5,973,681 A | 10/1999 | Tanigawa et al. | |

(Continued)

FOREIGN PATENT DOCUMENTS

| | | |
|---|---|---|
| CN | 101120358 | 2/2008 |
| GB | 2393349 A | 3/2004 |

(Continued)

OTHER PUBLICATIONS

"Stroud's Reviews ActiveX Controls", 1997 (web doc).

(Continued)

*Primary Examiner* — Jerry Dennison
*Assistant Examiner* — Adam Cooney
(74) *Attorney, Agent, or Firm* — Lee & Hayes, PLLC

(57) ABSTRACT

A web page architecture is provided for enabling a user browse a web page and identify items of multimedia media content that the user desires to deliver to his mobile device. The delivery mechanism to transmit such content on the user's mobile device may be either through push messaging and communicating with a client application on the user's mobile device.

20 Claims, 14 Drawing Sheets

U.S. PATENT DOCUMENTS

| | | | |
|---|---|---|---|
| 6,018,575 A | 1/2000 | Gross et al. | |
| 6,034,839 A | 3/2000 | Hamming | |
| 6,037,954 A | 3/2000 | McMahon | |
| 6,041,335 A | 3/2000 | Merritt et al. | |
| 6,047,189 A | 4/2000 | Yun et al. | |
| 6,049,796 A | 4/2000 | Siitonen et al. | |
| 6,064,980 A | 5/2000 | Jacobi et al. | |
| 6,073,148 A | 6/2000 | Rowe et al. | |
| 6,148,340 A | 11/2000 | Bittinger et al. | |
| 6,154,757 A | 11/2000 | Krause et al. | |
| 6,164,974 A | 12/2000 | Carlile et al. | |
| 6,201,771 B1 | 3/2001 | Otsuka et al. | |
| 6,233,318 B1 | 5/2001 | Picard et al. | |
| 6,300,947 B1 | 10/2001 | Kanevsky | |
| 6,313,828 B1 | 11/2001 | Chombo | |
| 6,317,742 B1 | 11/2001 | Nagaratnam et al. | |
| 6,331,867 B1 | 12/2001 | Eberhard et al. | |
| 6,335,678 B1 | 1/2002 | Heutschi | |
| 6,351,750 B1 | 2/2002 | Duga et al. | |
| 6,385,596 B1 | 5/2002 | Wiser et al. | |
| 6,401,086 B1 | 6/2002 | Bruckner | |
| 6,401,239 B1 | 6/2002 | Miron | |
| 6,442,651 B2 | 8/2002 | Crow et al. | |
| 6,449,627 B1 | 9/2002 | Baer et al. | |
| 6,457,030 B1 * | 9/2002 | Adams et al. | 715/239 |
| 6,466,951 B1 | 10/2002 | Birkler et al. | |
| 6,484,011 B1 | 11/2002 | Thompson et al. | |
| 6,493,734 B1 | 12/2002 | Sachs et al. | |
| 6,496,803 B1 | 12/2002 | Seet et al. | |
| 6,529,920 B1 | 3/2003 | Arons et al. | |
| 6,542,874 B1 | 4/2003 | Walker et al. | |
| 6,560,699 B1 | 5/2003 | Konkle | |
| 6,642,947 B2 | 11/2003 | Feierbach | |
| 6,658,623 B1 | 12/2003 | Schilit et al. | |
| 6,684,087 B1 | 1/2004 | Yu et al. | |
| 6,685,482 B2 | 2/2004 | Hopp et al. | |
| 6,687,878 B1 | 2/2004 | Eintracht et al. | |
| 6,704,733 B2 | 3/2004 | Clark et al. | |
| 6,721,869 B1 | 4/2004 | Senthil | |
| 6,721,871 B2 | 4/2004 | Piispanen et al. | |
| 6,724,403 B1 | 4/2004 | Santoro et al. | |
| 6,725,227 B1 | 4/2004 | Li | |
| 6,735,583 B1 | 5/2004 | Bjaestam et al. | |
| 6,741,855 B1 | 5/2004 | Martin et al. | |
| 6,744,891 B1 | 6/2004 | Allen | |
| 6,847,966 B1 | 1/2005 | Sommer et al. | |
| 6,904,449 B1 | 6/2005 | Quinones | |
| 6,912,398 B1 | 6/2005 | Domnitz | |
| 6,933,928 B1 | 8/2005 | Lilienthal | |
| 6,938,076 B2 | 8/2005 | Meyer et al. | |
| 6,985,932 B1 | 1/2006 | Glaser et al. | |
| 6,999,565 B1 | 2/2006 | Delaney et al. | |
| 7,000,032 B2 | 2/2006 | Kloba et al. | |
| 7,007,015 B1 | 2/2006 | Nayak | |
| 7,009,596 B2 | 3/2006 | Seet et al. | |
| 7,010,500 B2 | 3/2006 | Aarnio | |
| 7,020,654 B1 | 3/2006 | Najmi | |
| 7,054,914 B2 | 5/2006 | Suzuki et al. | |
| 7,057,591 B1 | 6/2006 | Hautanen et al. | |
| 7,062,707 B1 | 6/2006 | Knauft et al. | |
| 7,092,116 B2 | 8/2006 | Calaway | |
| 7,103,848 B2 | 9/2006 | Barsness et al. | |
| 7,107,533 B2 | 9/2006 | Duncan et al. | |
| 7,130,841 B1 | 10/2006 | Goel et al. | |
| 7,133,506 B1 | 11/2006 | Smith | |
| 7,135,932 B2 | 11/2006 | Quadir et al. | |
| 7,149,776 B1 | 12/2006 | Roy et al. | |
| 7,165,217 B1 | 1/2007 | Kondo | |
| 7,188,085 B2 | 3/2007 | Pelletier | |
| 7,209,888 B2 | 4/2007 | Frid-Nielsen et al. | |
| 7,237,123 B2 | 6/2007 | LeVine et al. | |
| 7,246,118 B2 | 7/2007 | Chastain et al. | |
| 7,249,060 B2 | 7/2007 | Ling | |
| 7,249,324 B2 | 7/2007 | Nakamura et al. | |
| 7,257,577 B2 | 8/2007 | Fagin et al. | |
| 7,278,092 B2 | 10/2007 | Krzanowski | |
| 7,287,068 B1 | 10/2007 | Eriksson et al. | |
| 7,290,285 B2 | 10/2007 | McCurdy et al. | |
| 7,298,851 B1 | 11/2007 | Hendricks et al. | |
| 7,304,635 B2 | 12/2007 | Seet et al. | |
| 7,310,629 B1 | 12/2007 | Mendelson et al. | |
| 7,313,759 B2 | 12/2007 | Sinisi | |
| 7,350,704 B2 | 4/2008 | Barsness et al. | |
| 7,355,591 B2 | 4/2008 | Sugimoto | |
| 7,386,480 B2 | 6/2008 | Sarig | |
| 7,398,244 B1 | 7/2008 | Keith | |
| 7,401,286 B1 | 7/2008 | Hendricks et al. | |
| 7,426,398 B2 | 9/2008 | Reisgies | |
| 7,454,238 B2 | 11/2008 | Vinayak et al. | |
| 7,509,270 B1 | 3/2009 | Hendricks et al. | |
| 7,533,152 B2 | 5/2009 | Stark et al. | |
| 7,539,478 B2 | 5/2009 | Herley et al. | |
| 7,562,032 B2 | 7/2009 | Abbosh et al. | |
| 7,567,798 B2 | 7/2009 | Brunel et al. | |
| 7,574,653 B2 | 8/2009 | Croney et al. | |
| 7,631,013 B2 | 12/2009 | Parsons et al. | |
| 7,634,429 B2 | 12/2009 | Narin et al. | |
| 7,656,127 B1 | 2/2010 | Shutt et al. | |
| 7,657,459 B2 | 2/2010 | Anderson et al. | |
| 7,657,831 B2 | 2/2010 | Donahue | |
| 7,680,849 B2 | 3/2010 | Heller et al. | |
| 7,788,369 B2 | 8/2010 | McAllen et al. | |
| 7,792,756 B2 | 9/2010 | Plastina et al. | |
| 7,835,989 B1 | 11/2010 | Hendricks et al. | |
| 7,865,405 B2 | 1/2011 | Hendricks et al. | |
| 7,865,567 B1 | 1/2011 | Hendricks et al. | |
| 7,908,628 B2 | 3/2011 | Swart et al. | |
| 7,920,856 B2 | 4/2011 | Lin et al. | |
| 2001/0007980 A1 | 7/2001 | Ishibashi et al. | |
| 2001/0025302 A1 | 9/2001 | Suzuki et al. | |
| 2001/0027478 A1 | 10/2001 | Meier et al. | |
| 2001/0037328 A1 | 11/2001 | Pustejovsky et al. | |
| 2001/0049623 A1 | 12/2001 | Aggarwal et al. | |
| 2001/0053975 A1 | 12/2001 | Kurihara | |
| 2002/0002540 A1 | 1/2002 | DeMello et al. | |
| 2002/0010707 A1 | 1/2002 | Chang et al. | |
| 2002/0010759 A1 | 1/2002 | Hitson et al. | |
| 2002/0012134 A1 | 1/2002 | Calaway | |
| 2002/0035697 A1 | 3/2002 | McCurdy et al. | |
| 2002/0054059 A1 | 5/2002 | Schneiderman | |
| 2002/0059415 A1 | 5/2002 | Chang et al. | |
| 2002/0069222 A1 | 6/2002 | McNeely | |
| 2002/0069312 A1 | 6/2002 | Jones | |
| 2002/0071139 A1 | 6/2002 | Janik | |
| 2002/0089968 A1 | 7/2002 | Johansson et al. | |
| 2002/0090934 A1 | 7/2002 | Mitchelmore | |
| 2002/0092031 A1 | 7/2002 | Dudkiewicz et al. | |
| 2002/0101447 A1 | 8/2002 | Carro | |
| 2002/0103809 A1 | 8/2002 | Starzl et al. | |
| 2002/0105539 A1 | 8/2002 | Gamzon et al. | |
| 2002/0120635 A1 | 8/2002 | Joao | |
| 2002/0123335 A1 | 9/2002 | Luna et al. | |
| 2002/0123336 A1 | 9/2002 | Kamada | |
| 2002/0129012 A1 | 9/2002 | Green | |
| 2002/0138291 A1 | 9/2002 | Vaidyanathan et al. | |
| 2002/0143822 A1 | 10/2002 | Brid et al. | |
| 2002/0147724 A1 | 10/2002 | Fries et al. | |
| 2002/0184319 A1 | 12/2002 | Willner et al. | |
| 2002/0194474 A1 | 12/2002 | Natsuno et al. | |
| 2003/0009459 A1 | 1/2003 | Chastain et al. | |
| 2003/0018720 A1 | 1/2003 | Chang et al. | |
| 2003/0025731 A1 | 2/2003 | Chastain et al. | |
| 2003/0028395 A1 | 2/2003 | Rodgers et al. | |
| 2003/0040970 A1 | 2/2003 | Miller | |
| 2003/0046233 A1 | 3/2003 | Ara et al. | |
| 2003/0052928 A1 | 3/2003 | Williams | |
| 2003/0058265 A1 | 3/2003 | Robinson et al. | |
| 2003/0065642 A1 | 4/2003 | Zee | |
| 2003/0069812 A1 | 4/2003 | Yuen et al. | |
| 2003/0074672 A1 | 4/2003 | Daniels | |
| 2003/0093312 A1 | 5/2003 | Ukita et al. | |
| 2003/0093382 A1 | 5/2003 | Himeno et al. | |
| 2003/0097354 A1 | 5/2003 | Finlay et al. | |
| 2003/0105679 A1 | 6/2003 | Krishnan et al. | |
| 2003/0110503 A1 | 6/2003 | Perkes | |
| 2003/0129963 A1 | 7/2003 | Nurcahya | |
| 2003/0135495 A1 | 7/2003 | Vagnozzi | |

| | | | | | | |
|---|---|---|---|---|---|---|
| 2003/0152894 | A1 | 8/2003 | Townshend | 2006/0256083 A1 | 11/2006 | Rosenberg |
| 2003/0163399 | A1 | 8/2003 | Harper et al. | 2006/0265472 A1 | 11/2006 | Seitz et al. |
| 2003/0164844 | A1 | 9/2003 | Kravitz et al. | 2006/0265518 A1 | 11/2006 | Owens et al. |
| 2003/0182551 | A1 | 9/2003 | Frantz et al. | 2006/0272028 A1 | 11/2006 | Maes |
| 2003/0190145 | A1 | 10/2003 | Copperman et al. | 2006/0281058 A1 | 12/2006 | Mangoaela |
| 2003/0191737 | A1 | 10/2003 | Steele et al. | 2007/0014404 A1 | 1/2007 | Cha |
| 2003/0204496 | A1 | 10/2003 | Ray et al. | 2007/0027857 A1 | 2/2007 | Deng et al. |
| 2003/0210789 | A1 | 11/2003 | Farnham et al. | 2007/0039023 A1 | 2/2007 | Kataoka |
| 2003/0212613 | A1 | 11/2003 | Sarig | 2007/0050346 A1 | 3/2007 | Goel et al. |
| 2004/0002943 | A1 | 1/2004 | Merrill et al. | 2007/0061335 A1 | 3/2007 | Ramer et al. |
| 2004/0003398 | A1 | 1/2004 | Donian et al. | 2007/0073596 A1 | 3/2007 | Alexander et al. |
| 2004/0015467 | A1 | 1/2004 | Fano | 2007/0079383 A1 | 4/2007 | Gopalakrishnan |
| 2004/0030686 | A1 | 2/2004 | Cardno et al. | 2007/0094285 A1 | 4/2007 | Agichtein et al. |
| 2004/0044723 | A1 | 3/2004 | Bell et al. | 2007/0094351 A1 | 4/2007 | Kalish et al. |
| 2004/0054499 | A1 | 3/2004 | Starzyk et al. | 2007/0105536 A1 | 5/2007 | Tingo |
| 2004/0098350 | A1 | 5/2004 | Labrou et al. | 2007/0112817 A1 | 5/2007 | Danninger |
| 2004/0117189 | A1 | 6/2004 | Bennett | 2007/0118533 A1 | 5/2007 | Ramer et al. |
| 2004/0120280 | A1 | 6/2004 | Western | 2007/0136660 A1 | 6/2007 | Gurcan et al. |
| 2004/0128359 | A1 | 7/2004 | Horvitz et al. | 2007/0136679 A1 | 6/2007 | Yang |
| 2004/0139400 | A1 | 7/2004 | Allam et al. | 2007/0150456 A1 | 6/2007 | Lian et al. |
| 2004/0167822 | A1 | 8/2004 | Chasen et al. | 2007/0152980 A1 | 7/2007 | Kocienda et al. |
| 2004/0201633 | A1 | 10/2004 | Barsness et al. | 2007/0169087 A1 | 7/2007 | Fadell |
| 2004/0205457 | A1 | 10/2004 | Bent et al. | 2007/0174545 A1 | 7/2007 | Okada et al. |
| 2004/0212941 | A1 | 10/2004 | Haas et al. | 2007/0185865 A1 | 8/2007 | Budzik et al. |
| 2004/0237033 | A1 | 11/2004 | Woolf et al. | 2007/0189719 A1 | 8/2007 | Furumachi et al. |
| 2004/0267552 | A1 | 12/2004 | Gilliam et al. | 2007/0219983 A1 | 9/2007 | Fish |
| 2004/0268253 | A1 | 12/2004 | DeMello et al. | 2007/0233562 A1 | 10/2007 | Lidwell et al. |
| 2005/0021464 | A1 | 1/2005 | Lindauer et al. | 2007/0233692 A1 | 10/2007 | Lisa et al. |
| 2005/0021611 | A1* | 1/2005 | Knapp et al. ............... 709/203 | 2007/0234209 A1 | 10/2007 | Williams |
| 2005/0022113 | A1 | 1/2005 | Hanlon | 2007/0240187 A1 | 10/2007 | Beach et al. |
| 2005/0044148 | A1 | 2/2005 | Son et al. | 2007/0250591 A1 | 10/2007 | Milic-Frayling et al. |
| 2005/0044224 | A1 | 2/2005 | Jun et al. | 2007/0282809 A1 | 12/2007 | Hoeber et al. |
| 2005/0049001 | A1 | 3/2005 | Lazaridis | 2007/0283173 A1 | 12/2007 | Webb et al. |
| 2005/0066219 | A1 | 3/2005 | Hoffman et al. | 2007/0288853 A1 | 12/2007 | Neil |
| 2005/0069225 | A1 | 3/2005 | Schneider et al. | 2007/0299913 A1 | 12/2007 | Griffin |
| 2005/0088410 | A1 | 4/2005 | Chaudhri | 2008/0005097 A1 | 1/2008 | Kleewein et al. |
| 2005/0102618 | A1 | 5/2005 | Naito | 2008/0005664 A1 | 1/2008 | Chandra |
| 2005/0125222 | A1 | 6/2005 | Brown et al. | 2008/0009268 A1 | 1/2008 | Ramer et al. |
| 2005/0138007 | A1 | 6/2005 | Amitay | 2008/0027933 A1 | 1/2008 | Hussam |
| 2005/0144251 | A1 | 6/2005 | Slate | 2008/0031595 A1 | 2/2008 | Cho |
| 2005/0144895 | A1 | 7/2005 | Grimes et al. | 2008/0040233 A1 | 2/2008 | Wildman et al. |
| 2005/0176438 | A1 | 8/2005 | Li | 2008/0051071 A1 | 2/2008 | Vishwanathan et al. |
| 2005/0177567 | A1 | 8/2005 | Hughes et al. | 2008/0082518 A1 | 4/2008 | Loftesness |
| 2005/0193330 | A1 | 9/2005 | Peters | 2008/0082911 A1 | 4/2008 | Sorotokin et al. |
| 2005/0195975 | A1 | 9/2005 | Kawakita | 2008/0089665 A1 | 4/2008 | Thambiratnam et al. |
| 2005/0198070 | A1 | 9/2005 | Lowry | 2008/0113614 A1 | 5/2008 | Rosenblatt |
| 2005/0208930 | A1* | 9/2005 | Zmrzli ...................... 455/414.4 | 2008/0120280 A1 | 5/2008 | Iijima et al. |
| 2005/0222977 | A1 | 10/2005 | Zhou et al. | 2008/0133479 A1 | 6/2008 | Zelevinsky et al. |
| 2005/0250439 | A1 | 11/2005 | Leslie | 2008/0163039 A1 | 7/2008 | Ryan et al. |
| 2005/0256822 | A1 | 11/2005 | Hollingsworth | 2008/0164304 A1 | 7/2008 | Narasimhan et al. |
| 2005/0273470 | A1 | 12/2005 | Heigold | 2008/0168073 A1 | 7/2008 | Siegel et al. |
| 2005/0288044 | A1 | 12/2005 | Atkins et al. | 2008/0208833 A1 | 8/2008 | Basmov |
| 2006/0004840 | A1 | 1/2006 | Senda | 2008/0216153 A1* | 9/2008 | Aaltonen et al. ............... 726/3 |
| 2006/0015649 | A1 | 1/2006 | Zutaut et al. | 2008/0222552 A1 | 9/2008 | Batarseh et al. |
| 2006/0020469 | A1 | 1/2006 | Rast | 2008/0243788 A1 | 10/2008 | Reztlaff et al. |
| 2006/0031316 | A1 | 2/2006 | Forstadius | 2008/0243828 A1 | 10/2008 | Reztlaff et al. |
| 2006/0047844 | A1 | 3/2006 | Deng | 2008/0259057 A1 | 10/2008 | Brons |
| 2006/0048184 | A1 | 3/2006 | Poslinski et al. | 2008/0293450 A1 | 11/2008 | Ryan et al. |
| 2006/0052089 | A1 | 3/2006 | Khurana et al. | 2008/0294674 A1 | 11/2008 | Reztlaff, II et al. |
| 2006/0057960 | A1 | 3/2006 | Tran | 2008/0295039 A1 | 11/2008 | Nguyen et al. |
| 2006/0061595 | A1 | 3/2006 | Goede et al. | 2009/0094528 A1 | 4/2009 | Gray et al. |
| 2006/0071754 | A1 | 4/2006 | Tofts et al. | 2009/0094540 A1 | 4/2009 | Gray et al. |
| 2006/0075205 | A1 | 4/2006 | Martin et al. | 2009/0228774 A1 | 9/2009 | Matheny et al. |
| 2006/0080261 | A1 | 4/2006 | Christal | 2009/0263777 A1 | 10/2009 | Kohn |
| 2006/0098900 | A1 | 5/2006 | King et al. | 2009/0286558 A1 | 11/2009 | Zufi et al. |
| 2006/0123053 | A1 | 6/2006 | Scannell | 2009/0318124 A1 | 12/2009 | Haughn |
| 2006/0129618 | A1 | 6/2006 | Maier | 2009/0319482 A1 | 12/2009 | Norlander et al. |
| 2006/0143558 | A1 | 6/2006 | Albornoz et al. | 2010/0017499 A1 | 1/2010 | Martinent et al. |
| 2006/0156222 | A1 | 7/2006 | Chi et al. | 2010/0023259 A1 | 1/2010 | Krumm et al. |
| 2006/0161578 | A1 | 7/2006 | Siegel et al. | 2010/0081120 A1 | 4/2010 | Nanjiani et al. |
| 2006/0161635 | A1 | 7/2006 | Lamkin et al. | 2011/0099487 A1 | 4/2011 | Pyhalammi et al. |
| 2006/0175983 | A1 | 8/2006 | Crouse et al. | | | |
| 2006/0179137 | A1 | 8/2006 | Jennings, III et al. | FOREIGN PATENT DOCUMENTS | | |
| 2006/0190489 | A1 | 8/2006 | Vohariwatt et al. | JP | 2001100702 A | 4/2001 |
| 2006/0190568 | A1 | 8/2006 | Patterson | JP | 2002099739 A | 4/2002 |
| 2006/0236240 | A1 | 10/2006 | Lebow | WO | WO9720274 | 6/1997 |
| 2006/0250994 | A1 | 11/2006 | Sasaki et al. | WO | WO0045588 | 8/2000 |
| 2006/0253441 | A1 | 11/2006 | Nelson | WO | WO0056055 A2 | 9/2000 |
| 2006/0253461 | A1 | 11/2006 | de Bonet | WO | WO0075840 A2 | 12/2000 |

| | | |
|---|---|---|
| WO | WO0239206 | 5/2002 |
| WO | WO2004055647 A2 | 7/2004 |
| WO | WO2006078728 A2 | 7/2006 |

OTHER PUBLICATIONS

James Marshall, "HTTP Made Really Easy", 1997 (web doc).
Office Action in U.S. Appl. No. 11/862,179 dated Jul. 30, 2009.
International Search Report in counterpart PCT Application No. PCT/US2008/054664 dated Jun. 9, 2008.
U.S. Appl. No. 11/277,894, filed Mar. 29, 2006, Jateen P. Parekh; Gregg E. Zehr, and Subram Narasimhan, "Reader Device Content Indexing".
U.S. Appl. No. 11/537,484, filed Sep. 29, 2006, Thomas Ryan, "Expedited Acquisition of a Digital Item Following a Sample Presentation of the Item."
U.S. Appl. No. 11/537,518, filed Sep. 29, 2006, John Lattyak, "Acquisition of an Item based on a Catalog Presentation of Items."
U.S. Appl. No. 11/693,685, filed Mar. 29, 2007, John Lattyak; John Kim; Steven Moy; Laurent An Minh Nguyen, "Relative Progress and Event Indicators."
U.S. Appl. No. 11/763,314, filed Jun. 14, 2007, John Lattyak; Craig Griffin; Steven Weiss, "Display Dependent Markup Language."
U.S. Appl. No. 11/763,339, filed Jun. 14, 2007, David Isbister; Marshall Williams; Nicholas Vaccaro, "Power Management Techniques for a User Device."
U.S. Appl. No. 11/763,357, filed Jun. 14, 2007, James Reztlaff II; John Lattyak, "Obtaining and Verifying Search Indices."
U.S. Appl. No. 11/763,363, filed Jun. 14, 2007, James Reztlaff II; Thomas Ryan, "Search Results Generation and Sorting."
U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."
U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."
U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."
U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."
U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."
U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin, "Providing User-Supplied Items to a User Device."
U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System."
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman, Robert Goodwin, "Incremental Updates of Items."
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."
U.S. Appl. No. 11/963,618, filed Dec. 21, 2007, Michael Rykov; Laurent An Minh Nguyen; Steven Moy, "Dissemination of Periodical Samples."
U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."
U.S. Appl. No. 12/351,629, filed Jan. 9, 2009, John Johnston; Weiping Dou; Steven Chase, "Antenna Placement on Portable Device."
U.S. Appl. No. 12/351,663, filed Jan. 9, 2009, Chris Li; Steven Chase, "Surface Mount Clip for Routing and Grounding Cables."
U.S. Appl. No. 12/360,089, filed Jan. 26, 2009, Thomas Dimson; Janna Hamaker, Eugene Kalenkovich, Tom Killalea, "Aggregation of Highlights."
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Appl. No. 29/331,528, filed Jan. 27, 2009, Chris Green, "User Interface Cluster."
"A Universally Unique IDentifier (UUID) URN Namespace", Jul. 2005, IETF, 32 pages. Retrieved on Apr. 21, 2010 at http://tools.ietf.org/pdf/rfc4122.pdf.
"Annotation Engine," Berkman Center for Internet & Society at Harvard Law School <http://cyber.iaw.harvard.edu/projects/annotate.html> [Retrieved Jan. 30, 2004].
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].
"Annotator Wishlist," Berkman Center for Internet & Society at Harvard Law School r <http://cyber.law.harvard.edulcite/annotate.cgi ?action=print&markup ;center=; view=http%3A%2F%2 Fcy . . . > [Retrieved Jan. 30, 2004].
BarnesandNoble.com, "Barnes and Noble Homepage", retrieved on Aug. 2, 2011 http://web.archive.org/web/19981202183957/http://www.barnesandnoble.com/, Dec. 2, 1998.
Beigbeder et al., "An Information Retrieval Model Using the Fuzzy Proximity Degree of Term Occurences", 2005 ACM Symposium on Applied Computing, pp. #1018-pp. #1022.
Bellwood, et al., "UDDI Version 2.04 API Specification UDDI Committee Specification, Jul. 19, 2002", Oasis, 95 pages. Retrieved on Apr. 21, 2010 via Wayback Machine at http://web.archive.org/web/20050314033213/www.oasis-open.org/committees/uddi-spec/doc/tcspecs.htm.
Roscheisen, M., et al., "Beyond Browsing: Shared Comments, SOAPs, Trails, and On-Line Communities," Computer Networks and ISDN Systems 27:739-749, 1995.
Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.
Bradley, "Plastic Shape Shifter", retrieved on May 7, 2009 at <<http://www.reactivereports.com/61/61_3.html>>, Chemistry WebMagazine, Issue No. 61, Dec. 2006, 2 pgs.
Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.
Canadian Office Action mailed Apr. 14, 2009 for Canadian Patent Application No. 2594573, a counterpart foreign application of U.S. Appl. No. 11/039,645.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.

Card et al., "3Book: A 3D Electronic Smart Book", AVI'04 May 25-28, 2004, Hallipoli, Italy, ACM 2004, pp. #303-pp. #307.

Cavanaugh "EBooks and Accommodations", Teaching Expectional Children vol. 35 No. 2 p. 56-61 Copyright 2002 CEC.

Cavanaugh, "EBooks and Accommodations", Teaching Exceptional Children, vol. 35, No. 2, Copyright 2002 CEC, 6 pages.

Chi et al. "eBooks with Indexes that Reorganize Conceptually", CHI2004, Apr. 24-29, 2004, Vienna, Austria ACM 1-58113-703-6/04/0004.

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Chinese Office Action mailed May 9, 2008 for Chinese Patent Application No. 200680002606.2, a counterpart foreign application of U.S. Appl. No. 11/039,645.

Chinese Second Office Action mailed Jun. 5, 2009 for Chinese Patent Application No. 200680002606.2, a counterpart foreign application of U.S. Appl. No. 11/039,645.

Chinese Third Office Action mailed Nov. 27, 2009 for Chinese Patent Application No. 200680002606.2, a counterpart foreign application of U.S. Appl. No. 11/039,645.

Chinese Office Action mailed Oct. 10, 2011 for Chinese patent application No. 200880017259.X, a counterpart foreign application of U.S. Appl. No. 11/693,682, 7 pages.

Chinese Office Action mailed Jul. 14, 2011 for Japanese patent application No. 20078004873.9, a counterpart foreign application of US patent No. 7,865,817, 6 pages.

Chinese Office Action mailed Aug. 25, 2011 for Chinese patent application No. 200880024964.2, a counterpart foreign application of U.S. Appl. No. 11/763,358, 6 pages.

Chinese Office Action mailed Sep. 26, 2011 for Chinese patent application No. 200880017589.9, a counterpart foreign application of U.S. Appl. No. 11/763,369, 9 pages.

Chinese Office Action mailed Sep. 30, 2011 for Chinese patent application No. 200880025056.5, a counterpart foreign application of U.S. Appl. No. 11/763,374, 9 pages.

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.

Desmoulins et al., "Pattern-Based Annotations on E-books: From Personal to Shared Didactic Content", Proceedings of the IEEE International Workshop on Wireless adn Mobile Techniques in Education, 2002, 4 pages.

Carter, S., et al., "Digital Graffiti: Public Annotation of Multimedia Content," Proceedings o/the CHI2004, Vienna, Austria, Apr. 24-29, 2004, pp. 1207-1210.

Elspass, et al., "Portable Haptic Interface with Active Functional Design", In Proceedings SPIE Conference on Smart Structures and Integrated Systems, Newport Beach, California, vol. 3668, Mar. 1999, 926-932.

Extended European Search Report mailed Dec. 22, 2009, issued in corresponding European Patent Application No. EP 06 71 8773.2, filed Jan. 18, 2006, 9 pages.

European Office Action mailed Dec. 12, 2009 for European Patent Application No. 06718773.2, a counterpart foreign application of U.S. Appl. No. 11/039,645, 9 pages.

European Office Action mailed Mar. 26, 20010 for European Patent Application No. 06718773.2, a counterpart foreign application of U.S. Appl. No. 11/039,645.

European Search report mailed Dec. 22, 2009 for European Patent Application No. 06718773.2, a counterpart foreign application of U.S. Appl. No. 11/039,645.

Office Action from the U.S. Patent and Trademark Office for U.S. Appl. No. 11/763,375, mailed Feb. 23, 2010, 15 pages.

Final Office Action for U.S. Appl. No. 11/763,358, mailed on Apr. 5, 2011, James R. Retzlaff II, "Managing Status of Search Index Generation".

Gladney, H. M.: "Access Control for Large Collections", NY, vol. 15, No. 2, Apr. 1, 1997, pp. 154-194.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-29.

Japanese Office Action mailed Jan. 25, 2011 for Japanese Patent Application No. 2007-552235, a counterpart foreign application of U.S. Appl. No. 11/039,645.

Japanese Office Action mailed Oct. 25, 2011 for Japanese patent application No. 2007-552235, a counterpart foreign application of U.S. Appl. No. 11/039,645, 3 pages.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Means, et al., " Evaluating Compliance with FCC Guidelines for Human Exposure to Radiofrequency Electromagnetic Fields", OET Bulletin 65 Edition 97-01, Jun. 2001, 57 pages.

Mercier et al., "Sphere of influence Model in Information retrieval", IEEE 2005 International Conference on Fuzzy Systems, pp. #120-pp. #125.

Nakatani, et al., "3D Form Display with Shape Memory Alloy", In Proceedings of 13th International Conference on Artificial Reality and Teleexistence (ICAT), 2003, pp. 179-184.

Navarro, et al., "Modern Information Retrieval, Chapter 8: Indexing and Searching", Jan. 1, 1999, Modern Information Retrieval, ACM Press, New York, pp. 191-228.

Final Office Action for U.S. Appl. No. 11/537,484, mailed on Jan. 24, 2012, Thomas A. Ryan, "Expedited Acquisition of a Digital Item Following a Sample Presentation of the Item", 22 pages.

Final Office Action for U.S. Appl. No. 12/414,914, mailed on Jan. 4, 2012, Agarwal et al., "Questions on Highlighted Passages", 41 pages.

Office action for U.S. Appl. No. 12/360,089, mailed on Oct. 5, 2011, Killalea et al., "Aggregation of Highlights", 75 pages.

Final Office Action for U.S. Appl. No. 11/763,392, mailed on Oct. 14, 2011, Thomas Ryan, "Administrative Tasks in a Media Consumption System ", 38 pages.

Office action for U.S. Appl. No. 11/763,390, mailed on Oct. 24, 2011, Bajaj et al., "Providing User-Supplied Items to a User Device ", 11 pages.

Final Office Action for U.S. Appl. No. 12/759,828, mailed on Nov. 10, 2011, James R. Retzalff II, "Search and Indexing on a User Device", 16 pages.

Final Office Action for U.S. Appl. No. 11/537,518, mailed on Nov. 25, 2011, John Lattyak, "Acquisition of an Item Based on a Catalog Presentation of Items," 8 pages.

Office action for U.S. Appl. No. 13/620,399, mailed on Nov. 6, 2012, Lint al., "Method and System for Transferring Content From the Web to Mobile Devices ", 11 pages.

Office action for U.S. Appl. No. 13/620,420, mailed on Nov. 6, 2012, Lin et al., "Method and System for Transferring Content From the Web to Mobile Devices ", 11 pages.

Non-Final Office Action for U.S. Appl. No. 11/763,386, mailed on Nov. 8, 2011, Thomas Ryan, "Handling of Subscription-Related Issues in a Media Consumption System", 10 pages.

Non-Final Office Action for U.S. Appl. No. 11/763,395, Thomas Ryan, "Providing Supplemental Information Based on Hints in a Media Consumption System ", 10 pages.

Office Action for U.S. Appl. No. 11/743,129, mailed on Dec. 20, 2011, Daniel J. Lin et al. "Method and System for Remotely Controlling the Display of Photos in a Digital Picture Frame", 18 pages.

Office action for U.S. Appl. No. 11/763,357, mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Non-Final Office Action for U.S. Appl. No. 13/251,598, mailed on Dec. 27, 2011, Daniel Lin et al., "Method and System for a Hosted Mobile Management Service Architecture", 26 pages.
Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, mailed on Feb. 13, 2012, Thomas Ryan et al., "Consumption of Items via a User Device", 14 pages.
Non-Final Office Action for U.S. Appl. No. 11/763,393, mailed on Feb. 16, 2012, John Lattyak et al., "Incremental Updates of Items", 24 pages.
Final; Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Non-Final Office Action for U.S. Appl. No. 11/537,518, mailed on Apr. 28, 2011.
Office action for U.S. Appl. No. 11/763,357, mailed on May 26, 2011, Reztlaff, "Obtaining and Verifying Search Indices".
Final Office Action for U.S. Appl. No. 11/763,314, mailed on Jun. 13, 2011, Craig S. Griffin, "Display Dependent Markup Language".
Non-Final Office Action for U.S. Appl. No. 11/693,682, mailed on Jun. 9, 2011, Hilliard B. Siegel, "Providing Annotations of a Digital Work".
Office action for U.S. Appl. No. 12/333,215, mailed on Jul. 18, 2011, Zagorie et al., "Device-Specific Presentation Control for Electronic Book Reader Devices", 22 pages.
Non-Final Office Action for U.S. Appl. No. 11/693,685, John Lattyak, "Relative Progress and Event Indicators".
Office action for U.S. Appl. No. 12/414,914, mailed on Aug. 4, 2011, Agarwal et al., "Questions on Highlighted Passages", 39 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Office action for U.S. Appl. No. 11/743,129, mailed on Sep. 11, 2012, Lin et al., "Method and System for Remotely Controlling The Display of Photos in a Digital Picture Frame", 20 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.

OQO "A Full PC That Fits in Your Pocket" Retrieved on Sep. 22, 2008 at <<http://www.oqo.com/support/documentation.html>>.
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US 08/64389, mailed on Jan. 28, 2009, 7 pgs.
PCT Search Report for PCT Application No. PCT/US10/22060, mailed Mar. 8, 2010 (7 pages).
PCT International Search Report and the Written Opinion for Application No. PCT/US2006/001752, mailed on Jul. 27, 2006, 8 pgs.
"Say No To Third Voice," Worldzone.net, 1999-2004, <http://worldzone.netiinternetipixelsnttv/index.html> [retrieved Jan. 30, 2004].
"Shape Memory Polymer", retrieved on May 7, 2009 at <<http://en.wikipedia.org/wiki/Shape_Memory_Polymer>>, Wikipedia, 8 pgs.
Sohn et al. "Development of a Standard Format for eBooks", SAC2002, Madrid, Spain, 2002 ACM 1-58113-445-2/02/0.
"The Berkman Center for Internet & Society at Harvard Law School: Annotation Engine,"Harvard.Edu, 1999-2004, <http://cyber.iaw.harvard.eduJprojects/annotate.html> [Retrieved Jan. 30, 2004], 3 pages.
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004].
"Universal Unique Identifier", dated Dec. 16, 2002. The Open Group, 9 pages. Retrieved on Apr. 21, 2010 via Wayback Machine at http://web.archive.org/web/20021216070918/http://www.opengroup.org/onlinepubs/9629399/apdxa.htm.
"Web Services Architecture: W3C Working Group Note Feb. 11, 2004", Feb. 11, 2004, W3C, 100 pages. Retrieved on Apr. 21, 2010 via Wayback Machine at http://web.archive.org/web/2004040205185/http://www.w3.org/TR/ws-arch/.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
Ziviani, N ED, Baeza-Yates R. et at: "Modern Information Retrieval, Text Operations", Jaunary 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.

* cited by examiner

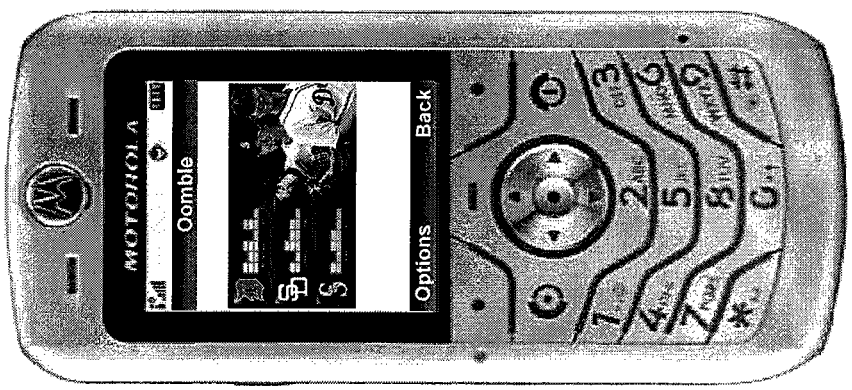
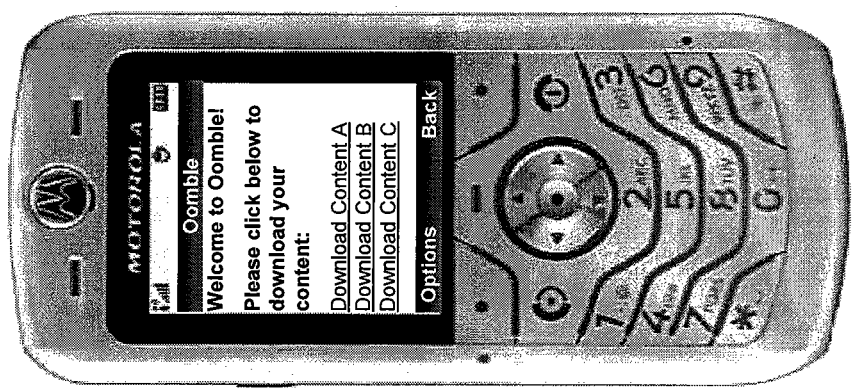
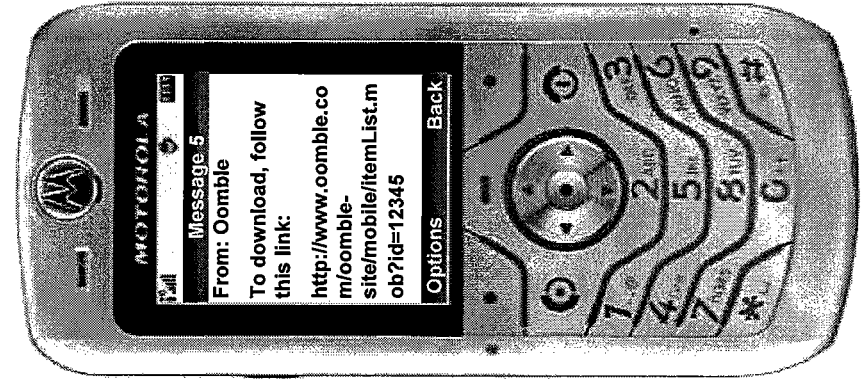
FIGURE 10

METHOD AND SYSTEM FOR TRANSFERRING CONTENT FROM THE WEB TO MOBILE DEVICES

CROSS REFERENCE TO RELATED APPLICATIONS

This application a continuation of U.S. patent application Ser. No. 11/862,179 filed on Sep. 26, 2007 and entitled "Method and System for Transferring Content from the Web to Mobile Devices," which is a continuation-in-part of U.S. patent application Ser. No. 11/674,081 filed Feb. 12, 2007, now U.S. Pat. No. 7,751,807, and entitled "Method and System for a Hosted Mobile Management Service Architecture," both of which are hereby incorporated by reference.

FIELD OF THE INVENTION

The present invention relates generally to an architecture for "mobilizing" web content and, more specifically, techniques for moving multimedia content from the web onto one's mobile device while browsing the web.

BACKGROUND OF THE INVENTION

Current solutions for transferring content from the web to a cell phone while browsing the web focus on extending the capabilities of currently existing web browsers through plug-in technologies or by requiring web sites to edit the source code of their web pages. In one current solution, depicted in FIG. 1, a web browser plug-in is downloaded and installed into a user's web browser. The user can then activate a console window 105 on the left side of the browser and drag and drop picture files on a visited web page into a staging area 110 in the console window. Once a file has been dragged into the staging area 110, the user can instruct the plug-in to transmit the file to the user's cell phone by pressing the "Send" button 115. The plug-in then utilizes one of several known delivery mechanisms as selected by the user (i.e., WAP Push, MMS Notification, SMS or MMS) to send a message to the user's cell phone. Once the message arrives at the user's phone, the user can view the message on the phone, retrieve the file (e.g., via a WAP page) and view and/or save it to his cell phone.

A similar solution is depicted in FIG. 2. A web browser plug-in is also downloaded and installed in the solution of FIG. 2; however, this plug-in provides a menu option 205 rather than a console window as provided in FIG. 1. When a user visits a web page and right-clicks his mouse on an image, the context menu 210 appears with the menu option 205 to send the image to the phone. If the user selects menu option 205, a new web page 215 originating from the solution's own web server appears and requests the user to enter his cell phone number 220. Once the user enters his cell phone number, he can press the "Send" button 225 which causes an SMS message to be sent from to the user's cell phone. The SMS message contains a link to a WAP page where the image can be viewed and/or saved to the cell phone.

An alternative solution is depicted in FIG. 3 which provides web sites a method to enable visitors to send photos from the web site to their cell phones. By embedding a small segment of JavaScript code 305 into the pages of the web site, the web site enables visitors to Alt-Click 310 on an image embedded in a web page to transfer a copy of the photo to the visitors' cell phone. Upon performing an Alt-Click on an image, a new web page 315 originating from the solution's own servers appears and requests the visitor to enter his cell phone number 320. Once the visitor enters his cell phone number, he can press the "Send SMS" link 325 which causes an SMS message to be sent to the user's cell phone. Similar to FIGS. 1 and 2, the SMS message contains a link to a WAP page where the image can be viewed and/or saved to the cell phone.

While the foregoing solutions provide a simple and easy method for web visitors to move multimedia content from the web to their phones, they have certain limitations that make them more difficult to achieve widespread adoption. For example, plug-in solutions similar to those depicted in FIG. 1 and FIG. 2 utilize a cumbersome download and installation process that often requires the closing of all web browsers and the rebooting of the user's personal computer. Because different web browsers such as Internet Explorer and Firefox offer different APIs, different plug-ins are needed to support different web browsers thereby increasing development and maintenance costs. Furthermore, the plug-ins themselves may need to be upgraded (i.e., subsequent downloads and installations) in order to extend and enhance the offered services. Embedded JavaScript solutions similar to FIG. 3 eliminate the disadvantages of the plug-in solutions, but remain cumbersome because they require web sites to edit the source code of their web pages. What is needed is a hosted solution that provides the user conveniences of plug-in solutions without the cumbersome installation processes or upgrade issues and without the requirement of requesting each web site to incorporate code into their own web pages to enable such functionality.

SUMMARY OF THE INVENTION

The present invention provides a method and for enabling a user to deliver multimedia content available from web pages to a mobile device. In particular, web-based code (such as JavaScript) is provided to enable a website to identify multimedia content displayed on a web page that can be delivered to a user's mobile device. The web-based code, for example, can take the form of a widget or button or other similar user interface. When a server as described herein receives an action taken by the user that corresponds to the web-based code and indicates a request to deliver of an item of multimedia content displayed on a web page of the website to the mobile device, the server transmits a sequence of instructions to a module on the mobile device configured to execute a sequence of operations corresponding to the sequence of instructions in order to retrieve the item of multimedia content and store the retrieved multimedia content in the mobile device.

BRIEF DESCRIPTION OF THE DRAWINGS

FIG. 10 depicts screenshots of a user's cell phone when content is delivered to the user's cell phone in one embodiment of the present invention.

DETAILED DESCRIPTION OF THE INVENTION

A. Web Page Architecture

Figure 1:
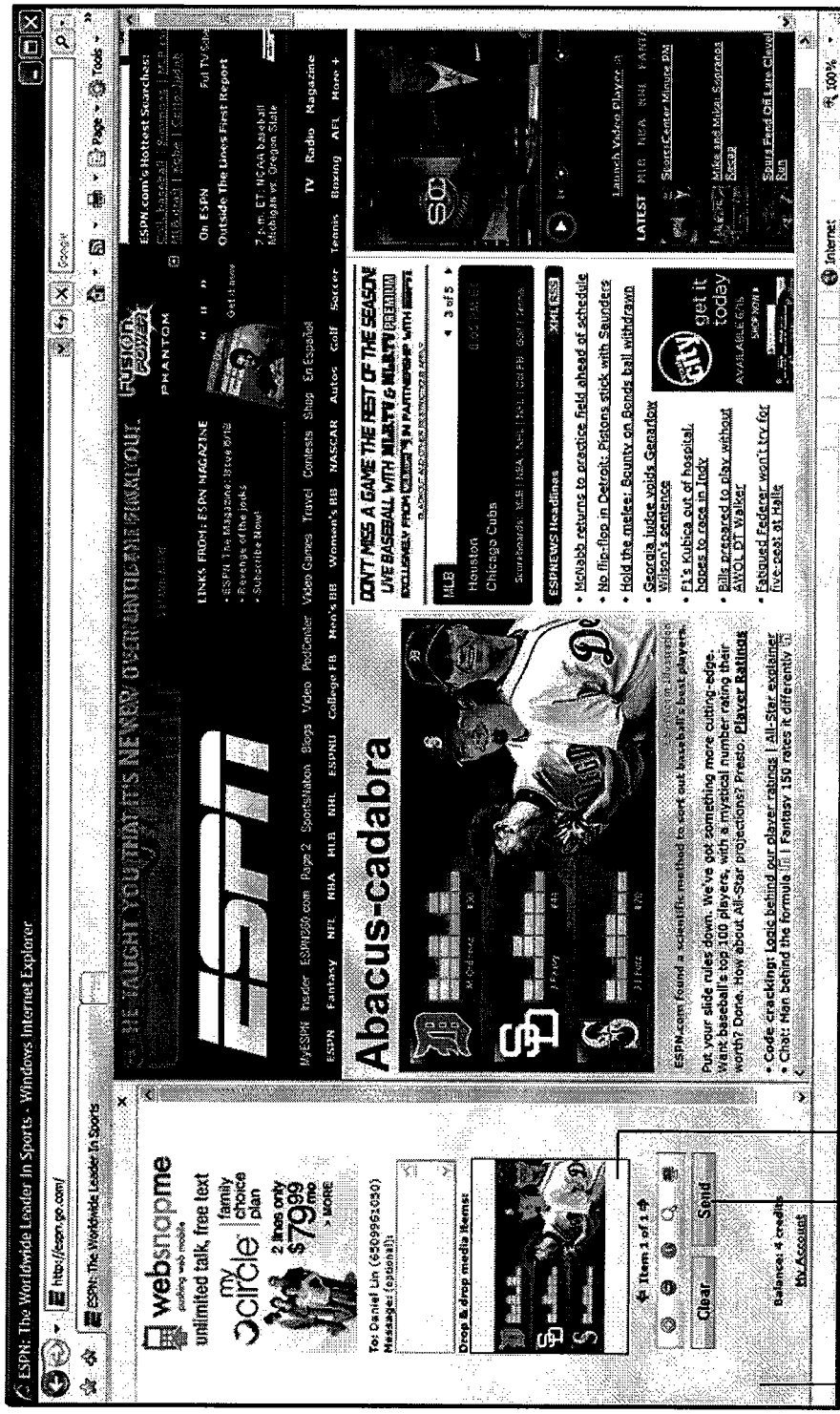
FIG. 1 depicts a current method of delivering web content to a cell phone using web browser plug-in technologies.
Figure 2:
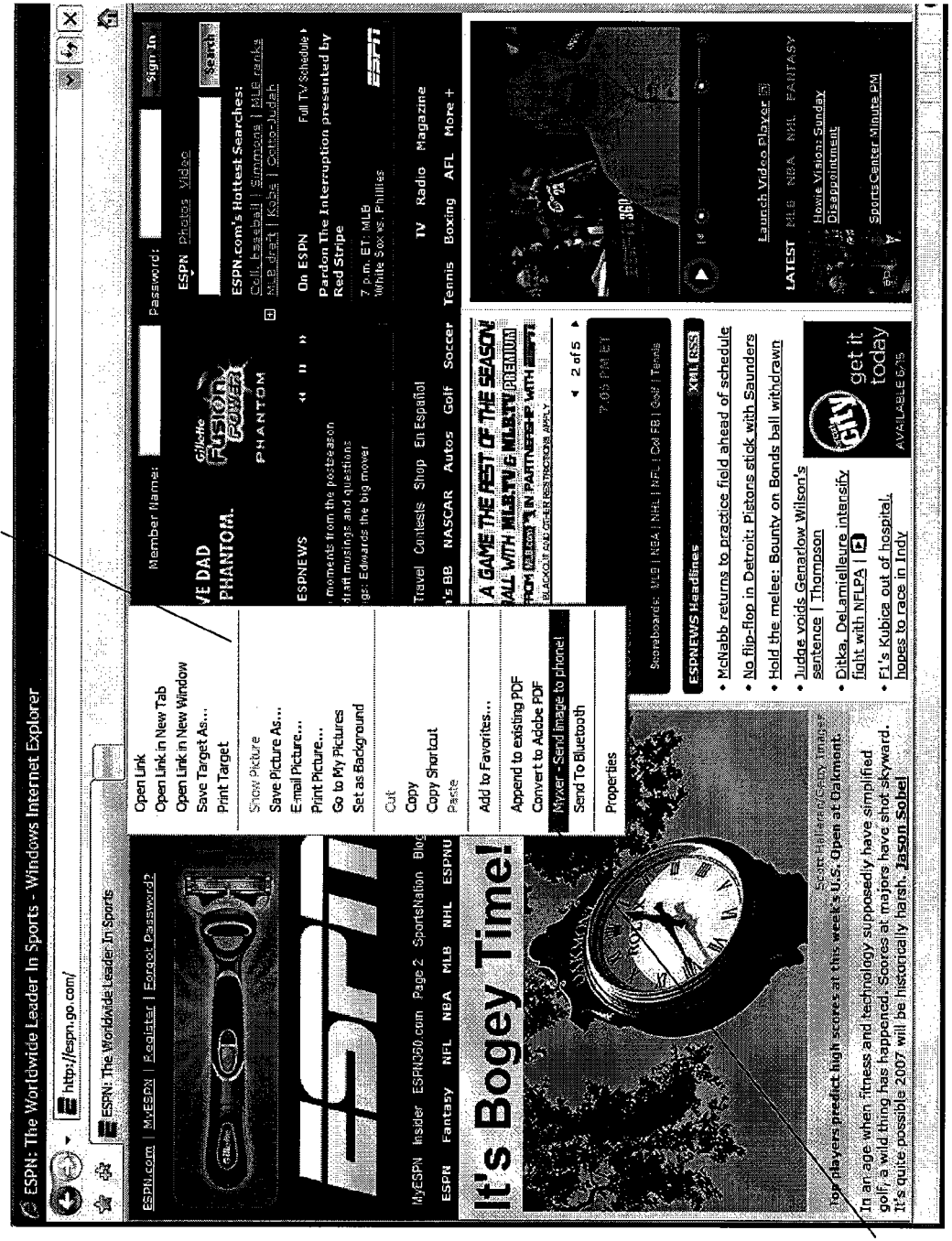
FIG. 2 depicts a current method of delivering web content to a cell phone using web browser plug-in technologies.
Figure 2:
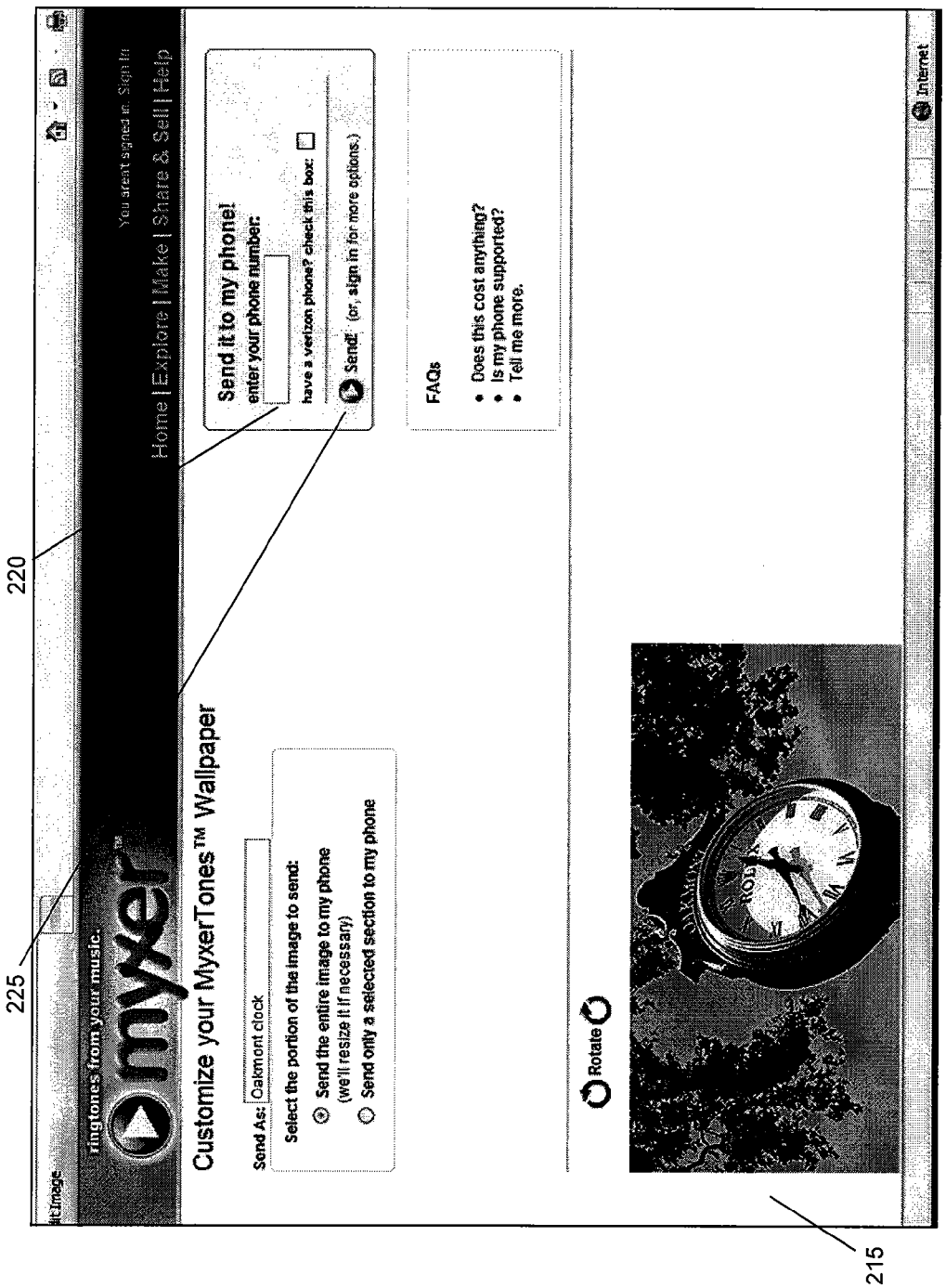
Figure 3:
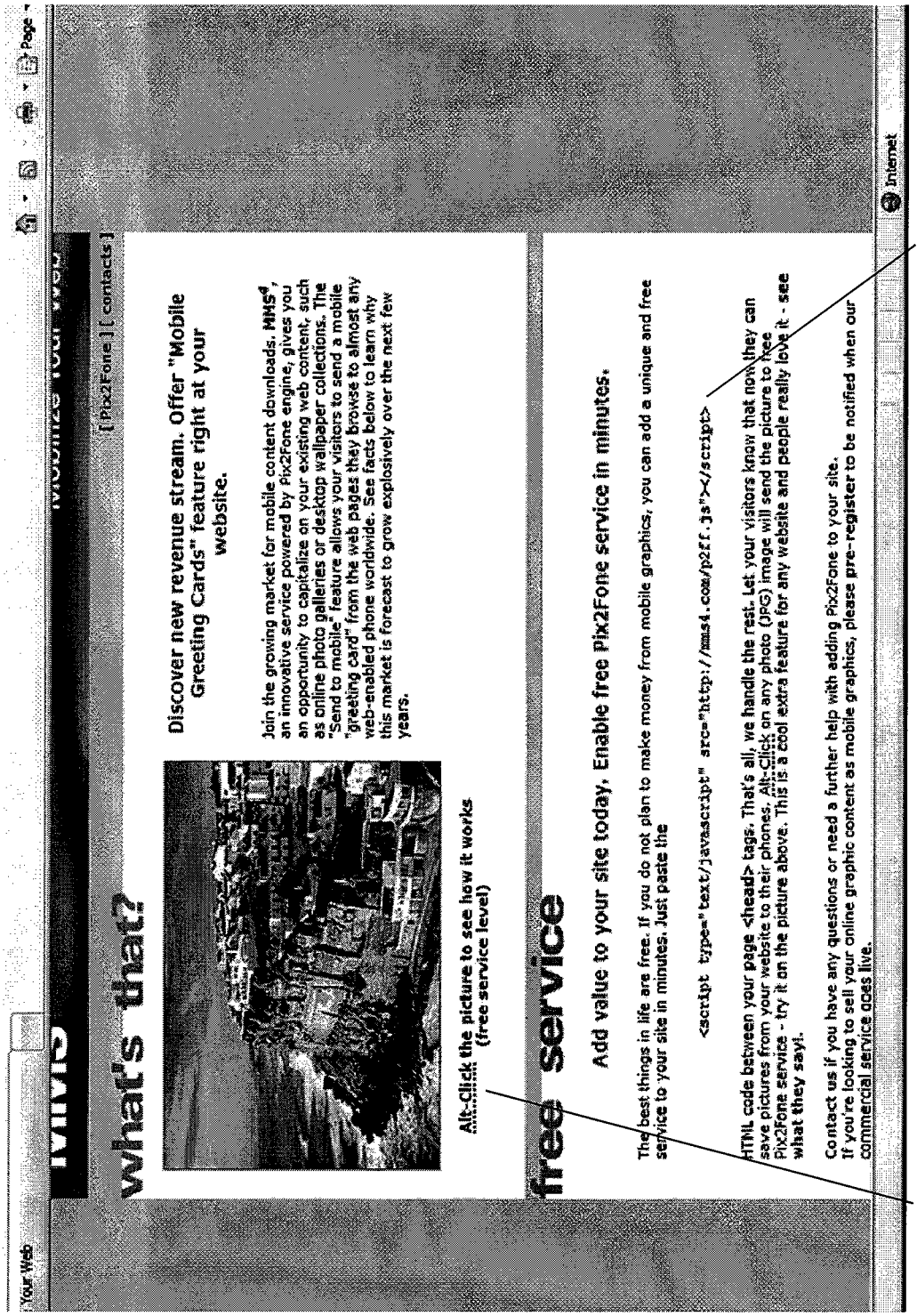
FIG. 3 depicts a current method of delivering web content to a cell phone using embedded JavaScript technology.
Figure 3:
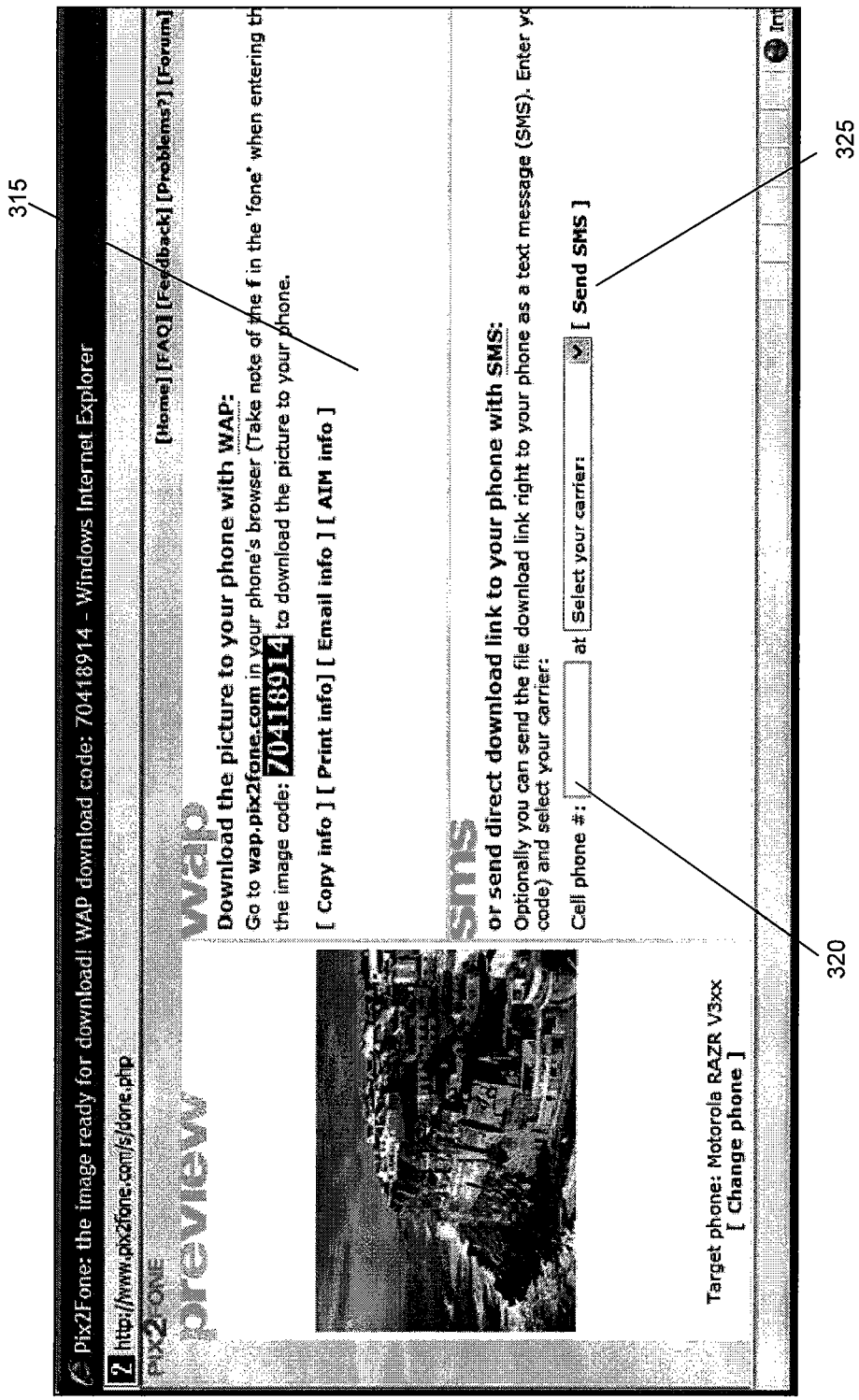
Figure 4:
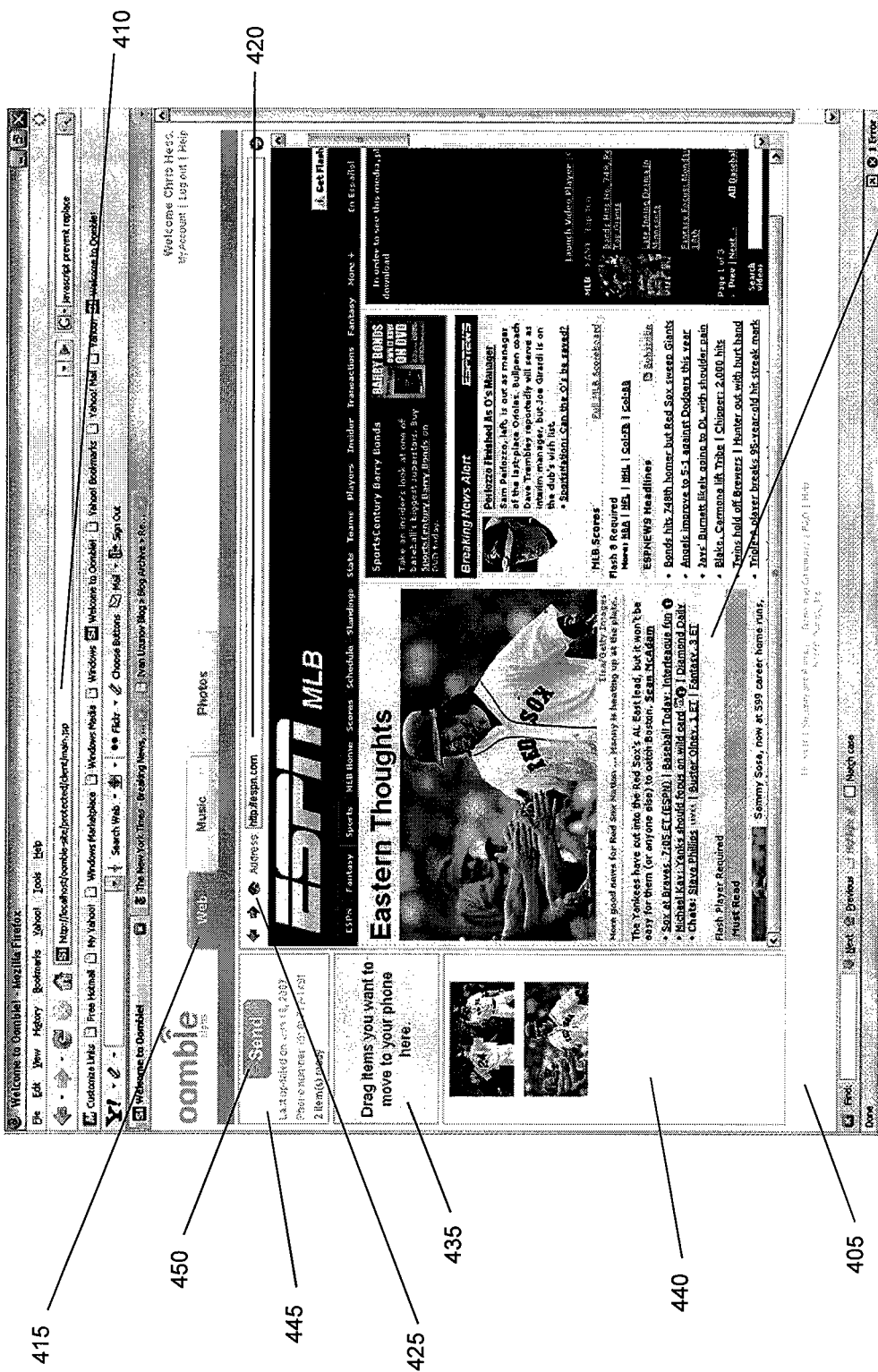
FIG. 4 depicts one exemplary embodiment of a web page user interface in accordance with the present invention.

FIG. 4 depicts one exemplary embodiment of a web page 405 user interface in accordance with the present invention. A user navigates to a web site by entering the URL into the address text field 410 of the web browser and logs into an account by providing his username and password. The user's account is established through a prior enrollment process whereby the user provided information including, for example, his cell phone number, cell phone manufacturer and model and carrier. Upon successful login, the user is presented with a set of tab panels, including a "Web" panel 415. Selection of Web panel 415 presents the user with a web browser like interface that includes a URL text field 420, a web browser toolbar 425 and an inline frame 430 for embedding other web pages from other sites into web page 405. When the user types a URL for a web site or web page into the URL text field 420, the web site or web page is retrieved and displayed in inline frame 430. Adjacent to Web panel 415 is a receiving panel that contains a drag and drop panel 435 into in which the user is able to drag and drop multimedia content (e.g., picture, video and audio files, etc.) that is displayed in the web page embedded in inline frame 430. The receiving panel also contains a staging panel 440 below the drag and drop panel 435 where a visual representation of various multimedia files that have been dragged into the drag and drop panel 435 during a session can be kept track of. As used herein, the term "receiving panel" may be considered to be the combination of the drag and drop panel 435 and the staging panel 440 or each such panel individually, as the context requires). Above the drag and drop panel 435 is a submission panel 445 with a "Send" button 450 to initiate a transfer of the files dragged into the staging panel 440 to the user's cell phone. Those with ordinary skill in the art will recognize that that FIG. 4 is merely exemplary of numerous ways to provide a web user interface for embedding a web browser within a web page that remain consistent with the spirit and scope of the present invention. For example, rather than presenting a drag and drop panel 435 into which multimedia content is dragged into and visualized in staging panel 440, an alternative user interface may utilize a tree structure panel with folder nodes including a "My Phone" node wherein the user can drag multimedia content into such folders before pressing the "Send" button 450 to initiate transfer.

Figure 5:
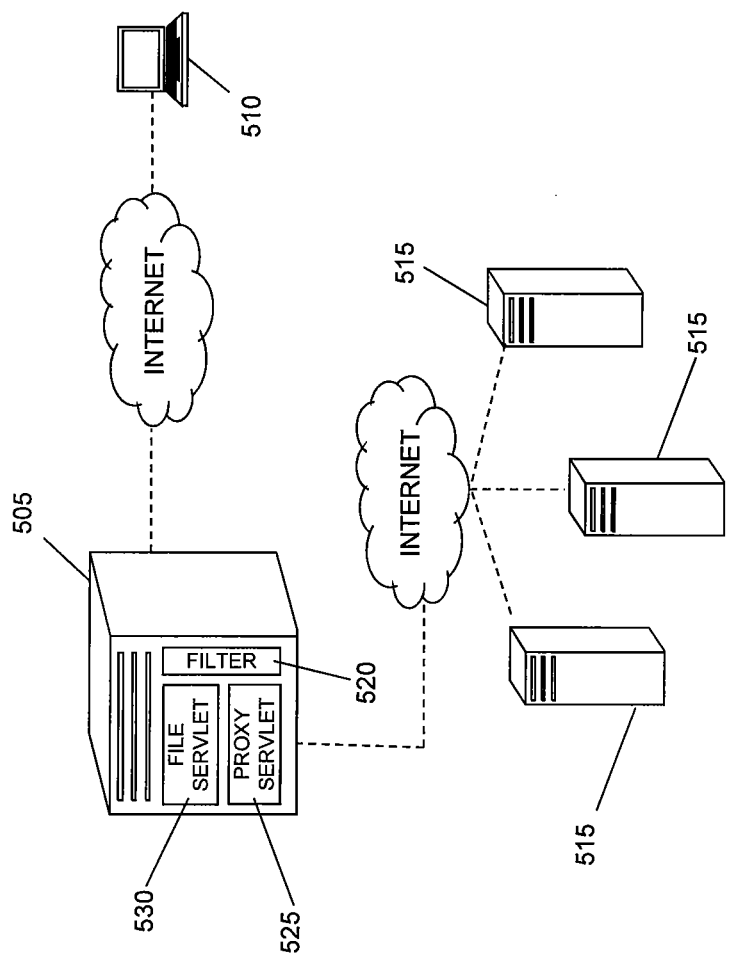
FIG. 5 depicts one exemplary embodiment of a network architecture underlying a web page user interface in accordance with the present invention.

FIG. 5 depicts one embodiment of a network architecture supporting a web page user interface similar to that of FIG. 4 in accordance with the present invention. Web server 505 (for example, an Apache Tomcat server) serves web page 405 to the user when the user logs into his account using an Internet connected terminal with a web browser such as 510 (e.g., laptop, personal computer, etc.). As further discussed below, web servers 515 that serve the actual web pages rendered in inline frame 430 are proxied through web server 505 as a result of interaction between client side JavaScript code implemented in web page 405 for Web panel 415, a filter 520 listening to all HTTP requests received at web server 505, and a proxy servlet 525 that handles communication between web servers 515 and the web server 505. Specifically, because of certain security limitations of inline frames, the DOM, or Document Object Model, of the web pages that are rendered in inline frame 430 cannot be programmatically accessed when those web pages are not received through web server 505, which serves the web page 405 to the web browser, itself. As such, without the proxy services of web server 505, hypertext references for multimedia content such as picture, video and audio files present in the HTML source code for any web page rendered in inline frame 430 cannot be readily obtained and parsed by client side JavaScript code in order to implement the drag and drop capability described in conjunction with FIG. 4. In order to create the user experience described in FIG. 4, web server 505 that serves web page 405 to the user's web browser also serves as a proxy web server (via proxy servlet 525) through which all HTTP requests that are either entered by the user into URL text field 420 or selected by the user as a hypertext reference in a web page in inline frame 420 are proxied. Because all web page HTTP requests are proxied through web server 505, client side JavaScript code is then able to access the DOM of the web pages rendered in inline frame 430 and therefore implement the drag and drop capability by accessing the hyperlink references associated with the pictures, audio and video and other multimedia content present in the rendered web pages. Those with ordinary skill in the art will recognize that although FIG. 5 and other portions of the exemplary embodiments discussed herein utilize servlets and JavaScript code as the underlying web technologies used to implement aspects of the present invention, many other alternative and substantially equivalent technologies may be utilized without departing from the spirit and scope of the invention. For example, rather than utilizing Java servlet technology, alternative non-Java dynamic Web content technologies such as PHP, CGI and ASP.NET may be used in other embodiments. Similarly and without limitation, rather than utilizing JavaScript code to implement functionality on the client side, JScript, JScript .NET, VBScript, ActionScript and other implementations of the ECMAScript standard may be used in other embodiments.

In an exemplary embodiment of web page 405, client side JavaScript code may be utilized to implement a rich user interactive experience such as, but not limited to, the drag and drop functionality from the web pages rendered in the inline frame 430 into the drag and drop panel 435. As detailed in FIG. 6, when the user inputs a URL address of a new web page into the URL text field 420 of Web panel 415 (Step 600), client side JavaScript code instructs the web browser to submit an HTTP POST message to the domain name (e.g., www.oomble.com) of web server 505 (Step 605). The HTTP POST message contains two name-value data parameters to indicate to web server 505 that the HTTP POST request is originating from Web panel 415 of web page 405. For example, if the user entered "www.espn.com" into URL text field 420, the JavaScript code would transmit an HTTP POST request to the domain name (www.oomble.com) of web server 505 including the data parameters: "serviceProxy=true&targetHost=www.espn.com". The filter 520 at web server 505 receives the HTTP POST request from the web browser and because serviceProxy=true, the filter 520 passes the HTTP POST request to proxy servlet 525 (Step 610). Those with ordinary skill in the art will also recognize that the request sent to the proxy server 505 may take one of several forms alternative to the HTTP POST request, such as an HTTP GET with data parameters appended to the URL in the normal fashion. Upon receiving the HTTP POST request, web server 505 may then allocate a session identifier to the HTTP POST request (e.g., directing the web browser to set a cookie with the session identifier in the subsequent HTTP Response transmitted later in Step 645) in order to maintain state for tracking the user's browsing session with web server 505. Proxy servlet 525 then saves www.espn.com as the true web server that the session identifier is associated with (Step 615) Proxy servlet 525 then takes the targetHost value, www.espn.com, and generates and transmits an HTTP GET request for www.espn.com (Step 620). Once proxy servlet 525 receives ESPN's HTTP Response containing the HTML code for its home page (Steps 625 and 630) in response to the HTTP GET request, it extracts the HTML code from ESPN's HTTP Response (Step 635) and generates its own HTTP Response for the web browser's original HTTP POST request and embeds the ESPN's HTML code as payload in such an HTTP Response (Step 640). Proxy server 525 then transmits the generated HTTP Response to the web browser which then renders ESPN's HTML code in inline frame 430 (Steps 645 to 655). Any file source attributes for HTML tags (e.g., src attributes for img or script tags) in the HTML code are either directly fetched if the src URL is absolute (i.e., shows the entire path to the file, including the scheme, server name, the complete path and the file name itself) or, if the src URL is relative (i.e., describes the location of the desired file with reference to the location of the file that contains the URL itself), fetched through proxy server 505 in a manner similar to resolving relative hypertext references or links as further detailed in conjunction with FIG. 7. By positioning proxy web server 505 in between the web browser and a server 515 that serves the actual HTML content, from the perspective of the web browser, the contents of inline frame 430 originate from proxy server 505 rather than the true server 515 thereby enabling client side JavaScript code to access the elements of the DOM of inline frame 430 and implement the drag and drop functionality described in FIG. 4.

Figure 6:
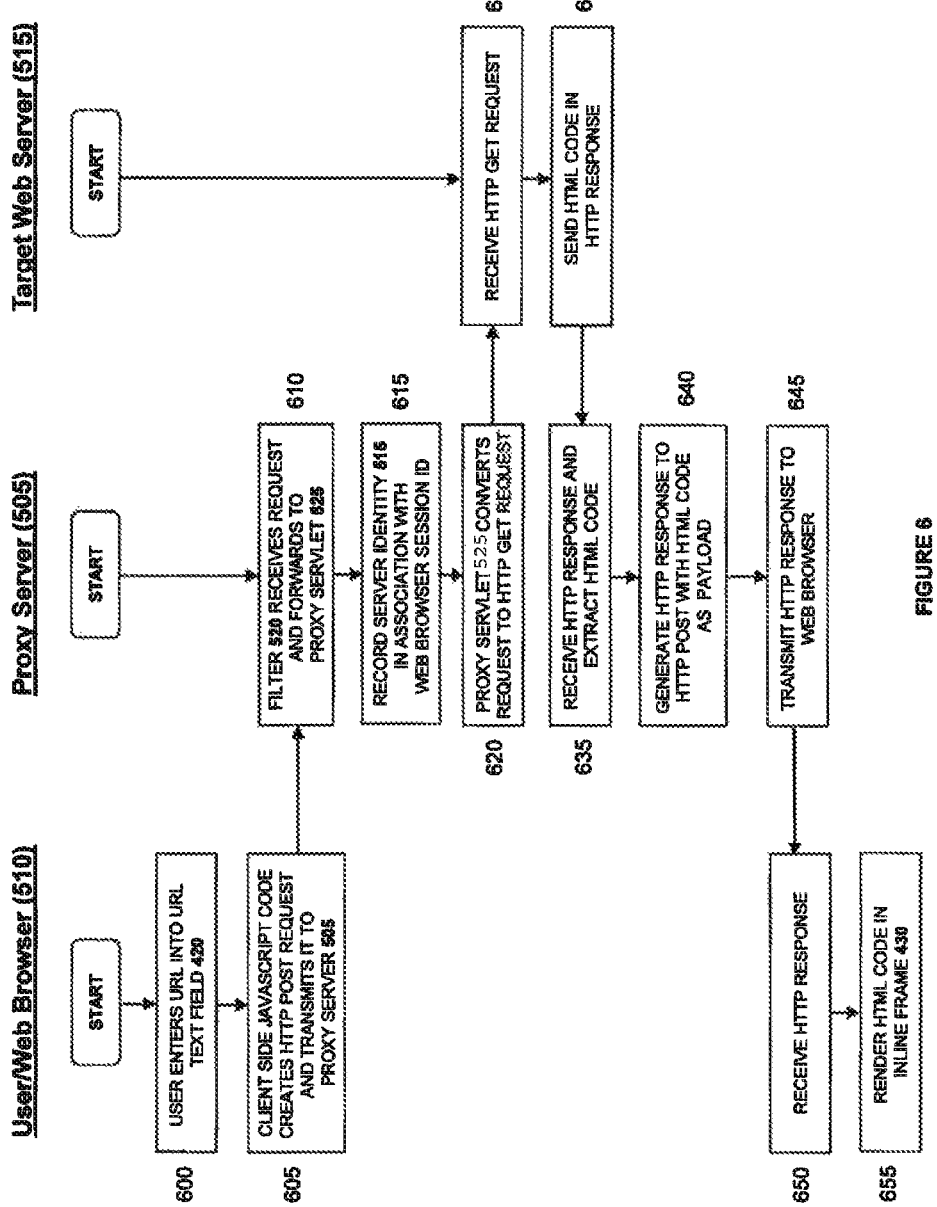
FIG. 6 depicts a flow chart detailing the interaction among the user's web browser, a proxy server and a true web server when the user enters a URL for an inline frame in accordance with the present invention.
Figure 7:
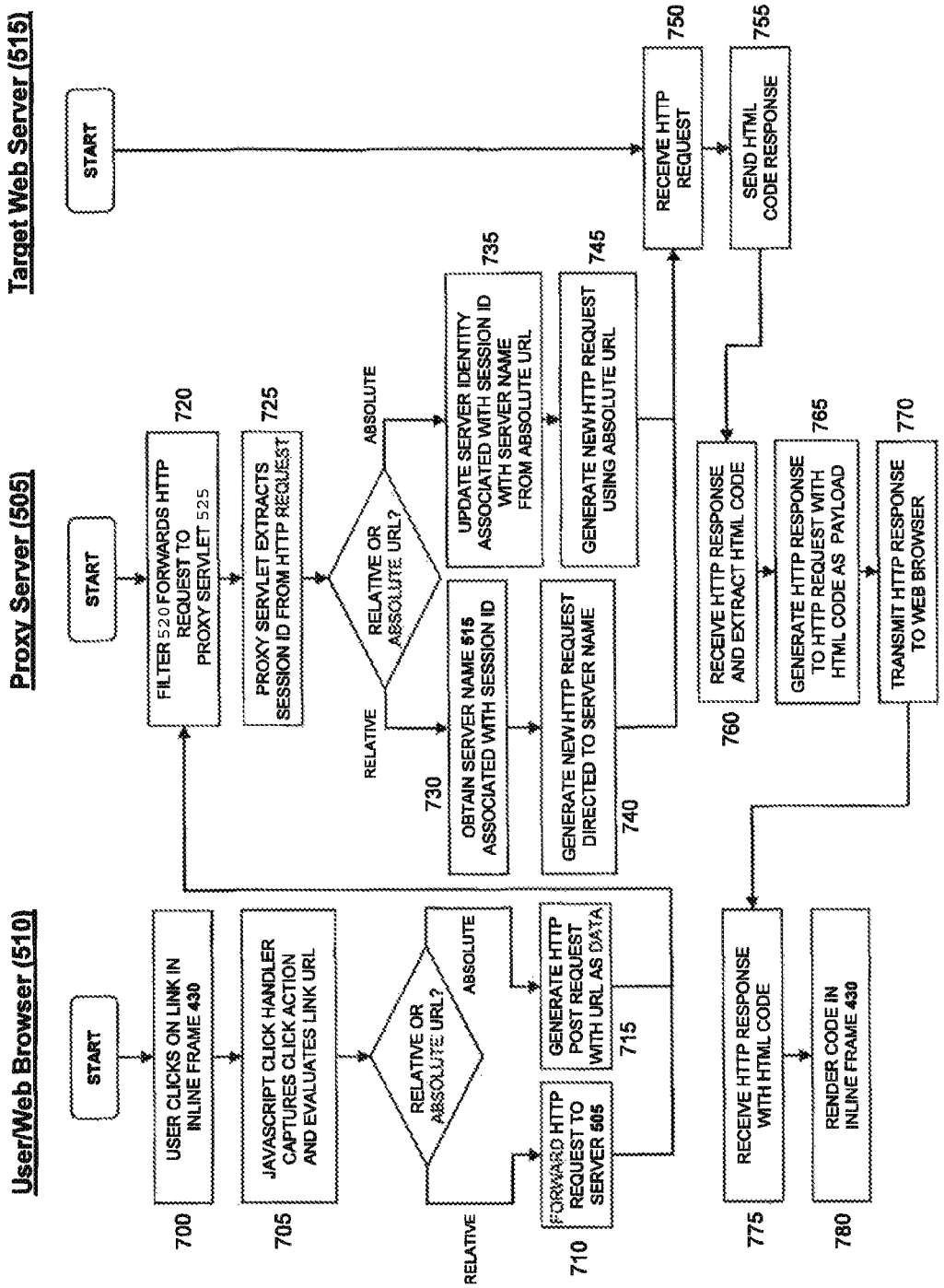
FIG. 7 depicts a flow chart detailing the interaction among the user's web browser, a proxy server and a true web server when the user clicks on a hypertext reference in a web page rendered in an inline frame in accordance with the present invention.

As detailed in FIG. 7, when a user desires to navigate the web through Web panel 415 by clicking on web page links in inline frame 430 (Step 700), new web pages that load into inline frame 430 through navigation should be able to be dragged and dropped into the drag and drop panel 435. To maintain such drag and drop functionality, the proxy web server 505 should continue to proxy communications between the user's web browser and web servers 515. To achieve this, a click handler written in client side JavaScript code monitors the user's clicks on hypertext references or links in inline frame 430 (Step 705). When the click handler receives a click action for a link that is a relative URL, the click handler is able to pass the HTTP request related to the click action directly to proxy server 505 (i.e., from the perspective of the user's web browser, the web page rendered in inline frame 430 was served by proxy server 505 rather than its true origin, web server 515) (Step 710). The HTTP request may also include the cookie that contains the session identi-fier set by the proxy server 505 in Step 615 of FIG. 6. Upon receiving the HTTP request, filter 520 passes the request to proxy servlet 525 (Step 720). Proxy servlet 525 is able to extract the session identifier from a session identifier cookie in the HTTP request (Step 725) and obtain the true web server address for which the HTTP request is intended (i.e., the true web server address was associated with the session identifier in Step 615) (Step 730). Proxy servlet 525 then generates its own HTTP request (Step 740), directing the HTTP request to true web server 515 and receives the HTTP Response (Steps 750 and 755). When it receives the HTTP Response from the true web server 515, it generates a new HTTP Response with the HTML code payload and transmits it to the waiting web browser (Steps 760 to 780). When the click handler encounters a link that is an absolute URL, the click handler utilizes a process similar to that described in FIG. 6 by generating an HTTP POST request to proxy server 505 with the data values serviceProxy equal to true and targetHost equal to the absolute URL (Step 715). Once the HTTP POST request is received by the filter 520 and forwarded to the proxy servlet 525, the web server identity that is associated with the session identifier (as set in Step 615) is updated to be the server name in the absolute URL (Step 735). An HTTP GET request is then generated by proxy servlet 525 containing the absolute URL. The process then continues onward through Step 750 in a manner similar to dealing with a relative URL.

When a user drags a picture or other multimedia content rendered in the web page of inline frame 430 into the drag and drop panel 435, client side JavaScript code obtains the source URL of the dragged content and transmits it to proxy server 505 which stores it in a queue. If the source URL is relative rather than absolute, client side JavaScript code converts the relative URL into an absolute URL by extracting and adding the server name from the URL displayed in the URL text field 420 to the path of the relative URL. Once the user has completed his session, he clicks on the "Send" button 450 which instructs the server 505 to initiate a delivery mechanism to the user's phone. Those with ordinary skill in the art will recognize that certain programmatic choices as described herein in conjunction with FIGS. 6 and 7 can be substituted with substantially equivalent alternatives. For example, alternative embodiments may not utilize HTTP requests and responses for Steps 605 and 645 but rather an alternative and possibly proprietary TCP/IP request and response protocol for the HTML contents for the URL in URL text field 420. Similarly, alternative embodiments may not utilize the same number or types of data parameters as those utilized in the HTTP POST message of Step 610 or Step 715. Rather than using cookie technology to maintain state (i.e., session identifiers), alternative embodiments may also utilize other state maintaining technologies such as methods include server side sessions, hidden variables, and URL encoded parameters. Similarly, alternative embodiments may use alternative HTTP requests (e.g., GET as opposed to POST, POST as opposed to GET, etc.) than those used in FIG. 6 or 7 and achieve the same results.

B. Delivery Architecture

Figure 8:
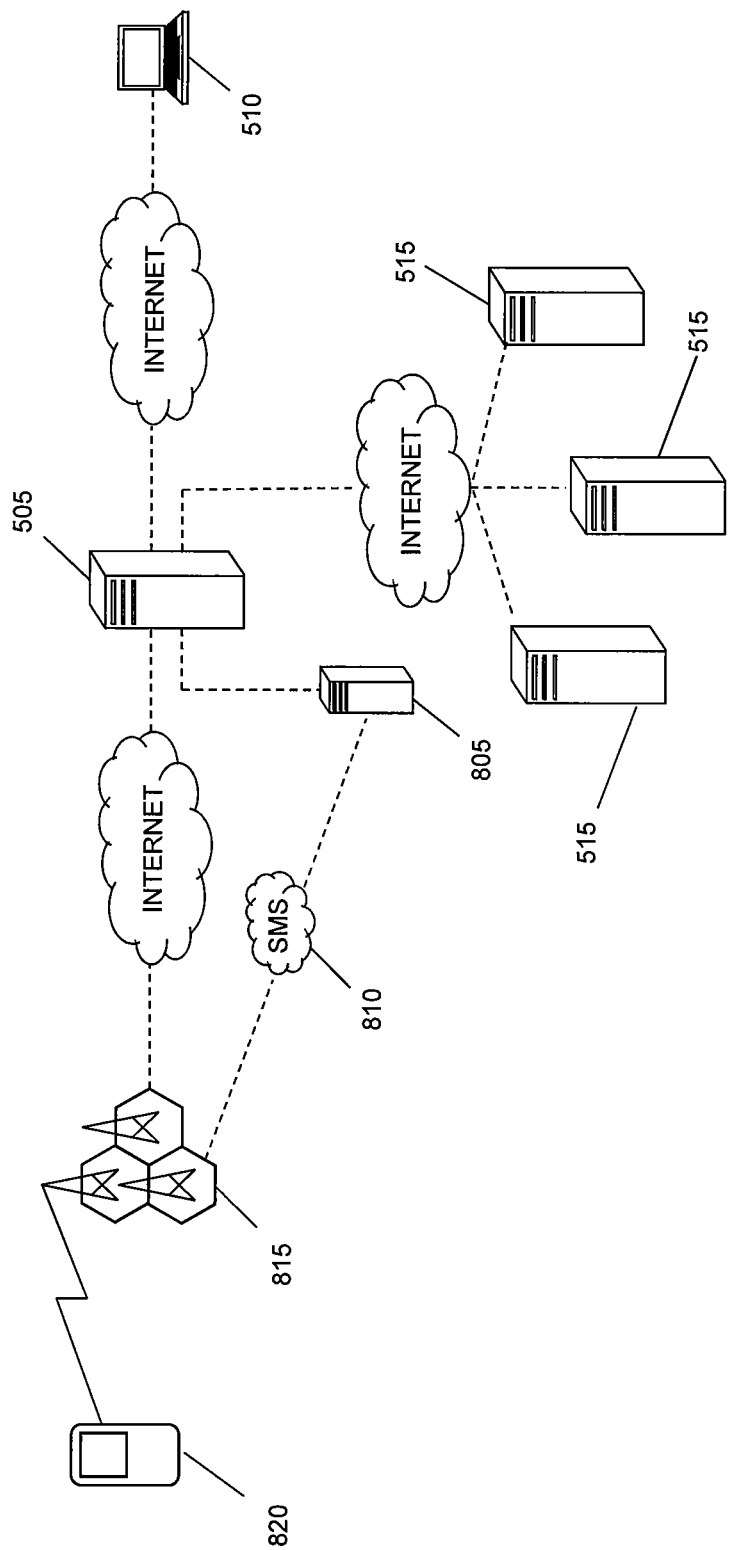
FIG. 8 depicts one exemplary embodiment of a cellular network architecture that may be used for delivery of content to a user's cell phone in accordance with the present invention.

FIG. 8 sets forth one exemplary embodiment of an architecture for delivery of the user's selected web content to his mobile cellular device such as cell phone 820. An underlying digital cellular wireless network system 815 in this environment may be a 3.5G network such as HSDPA/UMTS (High Speed Downlink Packet Access/Universal Mobile Telephone System). Other possible digital cellular wireless network systems would include, without limitation, all other forms of 2.5G (e.g., GPRS, EDGE, etc.), 3G (e.g., TD-SCDMA, CDMA2000, etc.), 3.5G and future generations of packet-switched cellular wireless technologies. Because the underlying digital cellular wireless network system 815 supports packet-switching capabilities, it is able to implement an IP-based network that supports TCP/IP based communications by cell phone 820. Additionally, the digital cellular wireless network system 815 also supports text messaging services such as SMS 810. The digital cellular wireless network system 815 may also provide cell phone 820 access to the Internet through its IP-based network capabilities. By obtaining an IP address from the underlying digital cellular wireless network system 815, cell phone 820 is able to communicate through the digital cellular wireless network system 815 through the Internet and ultimately to a server 505. In addition to communicating with cell phone 820, server 505 may also be coupled to an SMS gateway 805 in order to send SMS messages to cell phone 820. As used hereinafter, the term and reference number "server 505" may be used generally to refer to the server side capabilities (as opposed to the client side capabilities) and therefore may include functionality resident in the SMS gateway 805 as the context requires.

Figure 9:
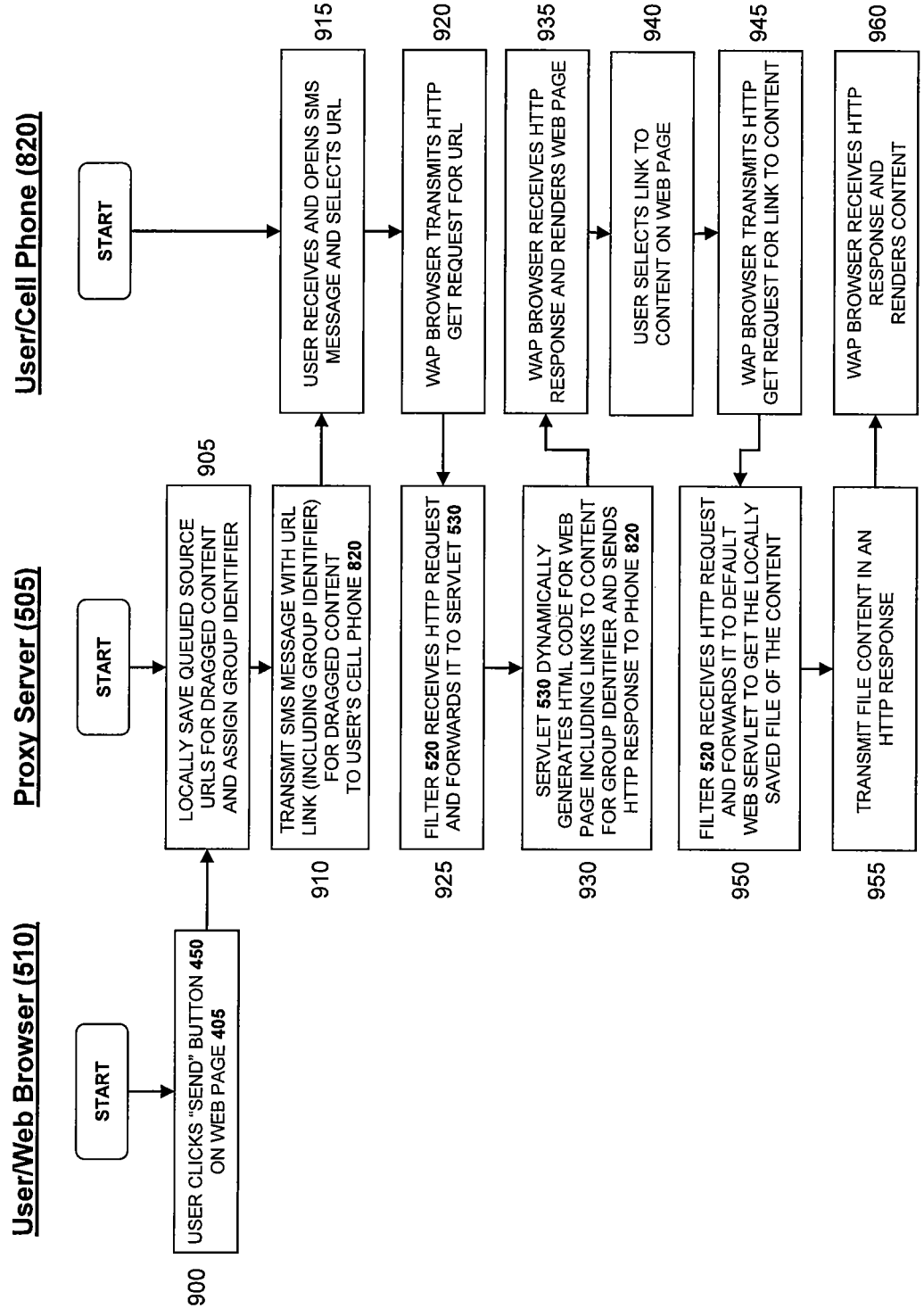
FIG. 9 depicts a flow chart detailing the interaction between the user's web browser, a proxy web server and the user's cell phone when content is delivered to the user's cell phone.

FIG. 9 details one exemplary embodiment of a delivery mechanism in accordance with the present invention. In such a delivery mechanism, once the user clicks on the "Send" button 450 (Step 900), the queued source URLs of all dragged content in staging area 440 are fetched by server 505, saved locally in the user's account and assigned a group identifier (Step 905). Server 505 (via SMS gateway 805) then delivers an SMS message to the user's cell phone 820 containing a URL back to the server 505 (Step 910). For example, if the domain name of server 505 is www.oomble.com, the URL in the SMS message may be: http://www.oomble.com/itemList-.mob?id=12345 in which 12345 is the group identifier for the dragged content and itemList.mob is a handle to a servlet 530 at server 505 that handles a request from cell phone 820 for the URL. When the user selects the URL in the SMS message (Step 915), the WAP browser on his cell phone 820 transmits an HTTP GET request to server 505 for the URL (Step 920). Server 505 forwards the HTTP request to the itemList.mob servlet 530 (Step 925) which then identifies the locally saved content files associated with the group identifier 12345 and dynamically generates a simple web page containing URL links to the locally saved content associated with the group identifier. The HTML code for the web page is then packaged into a HTTP Response by server 505 and transmitted back to the WAP browser of the cell phone 820 (Step 930) which then renders the web page on the WAP browser of the cell phone (Step 935). When the user selects a link to dragged content from the web page (Step 940), an HTTP request is transmitted to server 505 which delivers the content to the cell phone's WAP browser to be viewed (Steps 945 to 960). FIG. 10 depicts an exemplary embodiment of the various user interfaces on the user's cell phone 820 during the delivery mechanism of FIG. 9. In one exemplary embodiment, the SMS message of Step 910 may be similar to 1000, the web page generated in Step 930 may be similar to 1005 and the rendering of content in Step 960 may be similar to 1010. Those with ordinary skill in the art will recognize that the URL path examples presented in conjunction with FIG. 9 are merely exemplary and that path names and servlet names (e.g., itemList.mob) may vary in accordance with an implementer's programmatic design decisions. Similarly, those with ordinary skill in the art will recognize that certain programmatic choices as depicted in FIGS. 9 and 10 may be altered without changing the spirit and scope of the present invention. In an alternative embodiment, rather than SMS messaging, similar technologies such as WAP Push, MMS Notification, or MMS may be used instead. In an alternative embodiment, multimedia content may not necessarily be locally saved by server 505 as in Step 905. Instead, the links to the content generated in Step 930 could be links directly to the content as stored at its original web server 515. The SMS messaging and WAP browser interaction with the user's cell phone can also be altered without departing from the spirit of the invention. For example, rather than sending the a link to a WAP page containing links to the content in the SMS message as in 1000, the links to content may be sent directly in the SMS message itself. Similarly, rather than providing text links to image content in the a WAP web page such as in 1005, the actual images themselves may be embedded and rendered in the WAP web page itself. Those with ordinary skill in the art will also recognize that additional features and enhancements may be added to a delivery mechanism in accordance with the present invention with departing from the spirit of the present invention. For example, server 505 may perform conversion or data manipulation processes on multimedia content to be transferred to a user's cell phone in order to customize such content to be viewed on the particular make and model of the user's cell phone. For example, photos may be cropped or resized to better fit the screen of the cell phone and audio files may be re-sampled or compressed to minimize network transfer time to the cell phone.

An alternative exemplary embodiment in accordance with the present invention utilizes a thin client application this is installed on the user's cell phone 820 similar to the thin client application 235 described in U.S. patent application Ser. No. 11/674,081 filed Feb. 12, 2007, entitled "Method and System for a Hosted Mobile Management Service Architecture" (hereinafter "Parent Application") which is hereby incorporated by reference. In such an embodiment, when the user clicks on the "Send" button, the queued source URLs of all dragged content in staging area 440 are fetched by server 505 and transmitted to the cell phone 820. Specifically, as further detailed in the Parent Application, the thin client application receives communications from server 505 through the cellular network and interacts with the cell phone's file system. Depending upon the user's cell phone model and carrier, server 505 transmits to the thin client application the correct sequence of "primitives" or file system operations that enables the thin client application to store the dragged content in the correct location in the file system of the cell phone 820 to be consumed by the phone's native applications. In particular, when the user completes a web navigation session using inline frame 430, having dragged certain content from the web into the staging area 440, server 505 pushes all new additions of content made by the user to the cell phone. By transmitting an SMS push message to the push registry of the cell phone 820, server 505 activates the thin client application which then initiates communication back to server 505 to receive and perform all the changes to content on the cell phone 820 made by the user when navigating the web in inline frame 430. Once the thin client completes its activities, the user is able to access the native applications of the cell phone in order to view new photos, listen to new songs, or watch new videos transferred onto the cell phone from the web pages in inline frame 430.

C. Traditional Web Page and Fee Generation Enhancements

In addition to providing the capability for users to navigate the web through an inline frame 430 in a single web page 405 hosted by server 505 (e.g., www.oomble.com) and drag content into their cell phones, the present invention may also support the capability for users to navigate the web through traditional web browsers (e.g., Internet Explorer, Firefox, Safari, etc.) and drag content onto the phone after navigating through such traditional means. Web sites can place a small link, button or "widget" in the footer, header or other area of their web pages which when clicked will lead to web page 405 and automatically populate URL text field 420 with the address of the visited web page. In particular, JavaScript code can be provided to such websites such that when a user clicks on such a link, button or widget in a particular web page, the URL of the web page is extracted from the web browser and transmitted to server 505. For example, if a user is currently visiting the web page http://sports.espn.go.com/nba/index at the ESPN web site and clicks on such a link, button or widget in the web page, client side JavaScript code extracts the URL and inserts it into an HTTP GET request that is transmitted to server 505 such as http://oomble.com/oomble-site/oomblize.do?referer=http://sports.espn.go.com/nba/index). When server 505 receives the HTTP GET request, a servlet for oomblize.do may extract a user identifying cookie from the HTTP GET request and if the user has enabled auto-login features on his account, the servlet may redirect the request to a web page with Web panel 415 displayed and http://sports.espn.go.com/nba/index populated the URL in URL text field 420 and displayed in inline frame 430. From that point, the user will be able to drag content from the ESPN web page into his cell phone as previously taught herein. If the auto-login feature has not been enabled, the servlet will redirect the request to the login page and, if login is successful, to the Web panel 415 page.

In an exemplary embodiment, a revenue generation system may be built on top of the service described herein for transferring content from the web to user's cell phone. For example, third party web sites and/or content providers can choose to charge a fee for each item of content originating from their site (or owned by the content owner) that a user drags from the web to his cell phone through use of server 505. An automated fee management platform may be offered by server 505 that allows third party web sites and/or content owners to customize the amount of such fees and/or the particular content on the web sites that are to be assessed such a fee. In one embodiment, such an automated fee management platform is offered through the web such that third party web sites and content owners may log onto their accounts on the web and customize their profile with the desired fee structure (e.g., $1.00 charged for any photo dragged from the web site into the user's cell phone). Such profiles may be stored in a database coupled to server 505 such that when a user then visits the web site through inline frame 430 (or by clicking a widget in the web site as described herein) and drags a photo from the web site into his cell phone, server 505 can extract the fee structure profile from the database and assess the appropriate fee to the user for the transfer of such content to his cell phone. Additionally, such a fee management platform may also be used to enable third party web sites and/or content providers who do not desire their content to be dragged into user cell phones through server 505 to set their profile as such. In such a situation, server 505 shall prevent such content from being dragged onto users' cell phones.

D. Messaging and Sharing Enhancements

Figure 11:
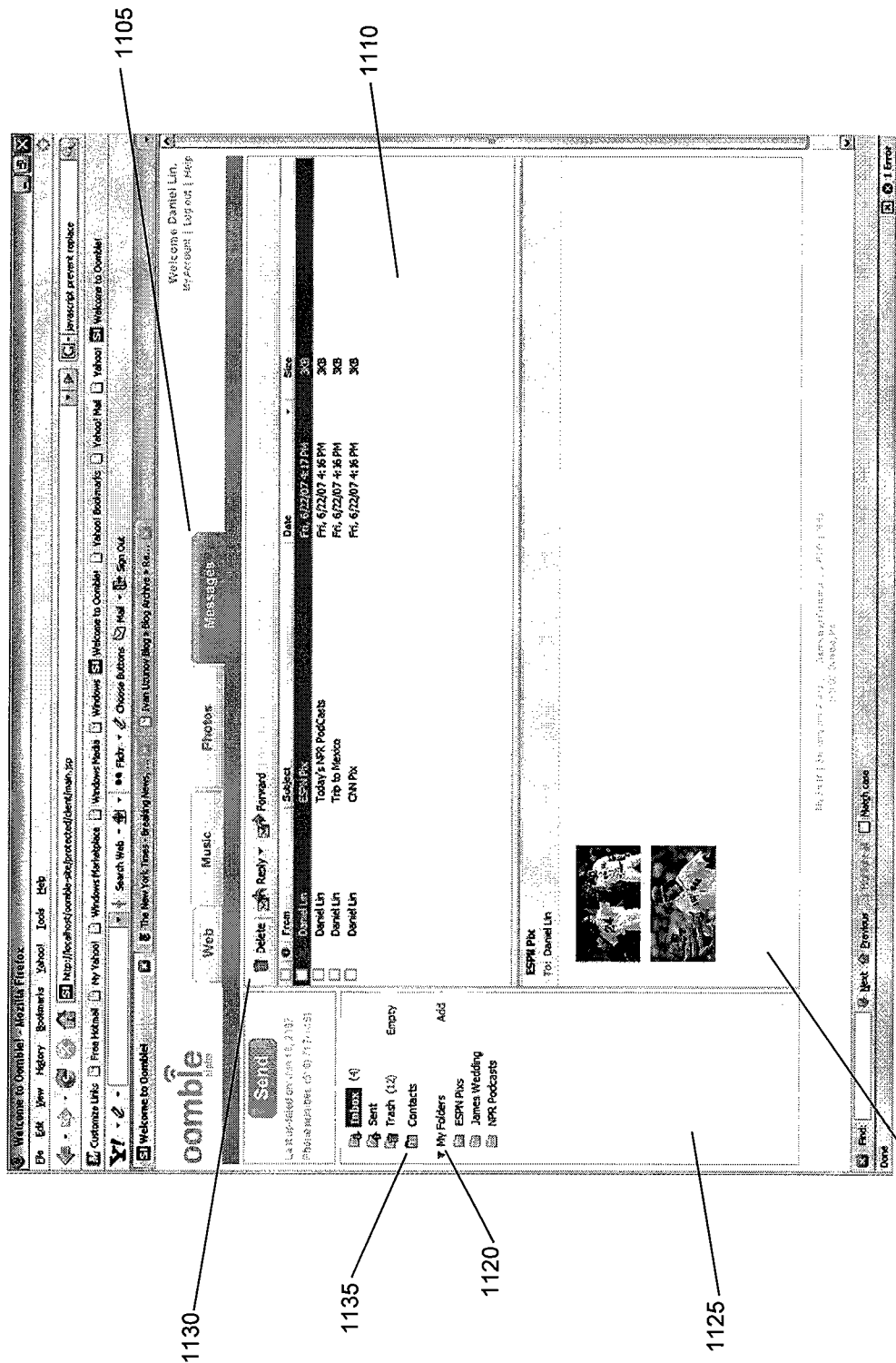
FIG. 11 depicts one exemplary embodiment of an SMS message tracking user interface in accordance with the present invention.

In addition to providing the capability to drag contents from the web into a user's cell, the present invention may also provide the capability to keep track of such transfers from the web to the user's cell phone. As detailed in FIG. 11, in one exemplary embodiment utilizing SMS messaging (FIG. 9) as the delivery mechanism, a "Messages" tab panel 1105 may be available in web page 405. The contents of the Messages panel 1105 may be similar in layout to a standard email system layout. The main messages panel 1110 maintains a historical list of SMS messages sent by the user using server 505 to his cell phone 820. Selection of any particular entry in the main messages panel causes the message preview panel 1115 to display those items of content that were dragged by the user into the drag panel 440 and sent to the user's cell phone 820. The user is also able to organize the various SMS messages sent to his cell phone in folders 1120 in the explorer panel 1125. Utilizing the toolbar 1130, a user can also forward such SMS messages to friends in his contact list 1135 or by entering such friends cell phone numbers.

Figure 12:
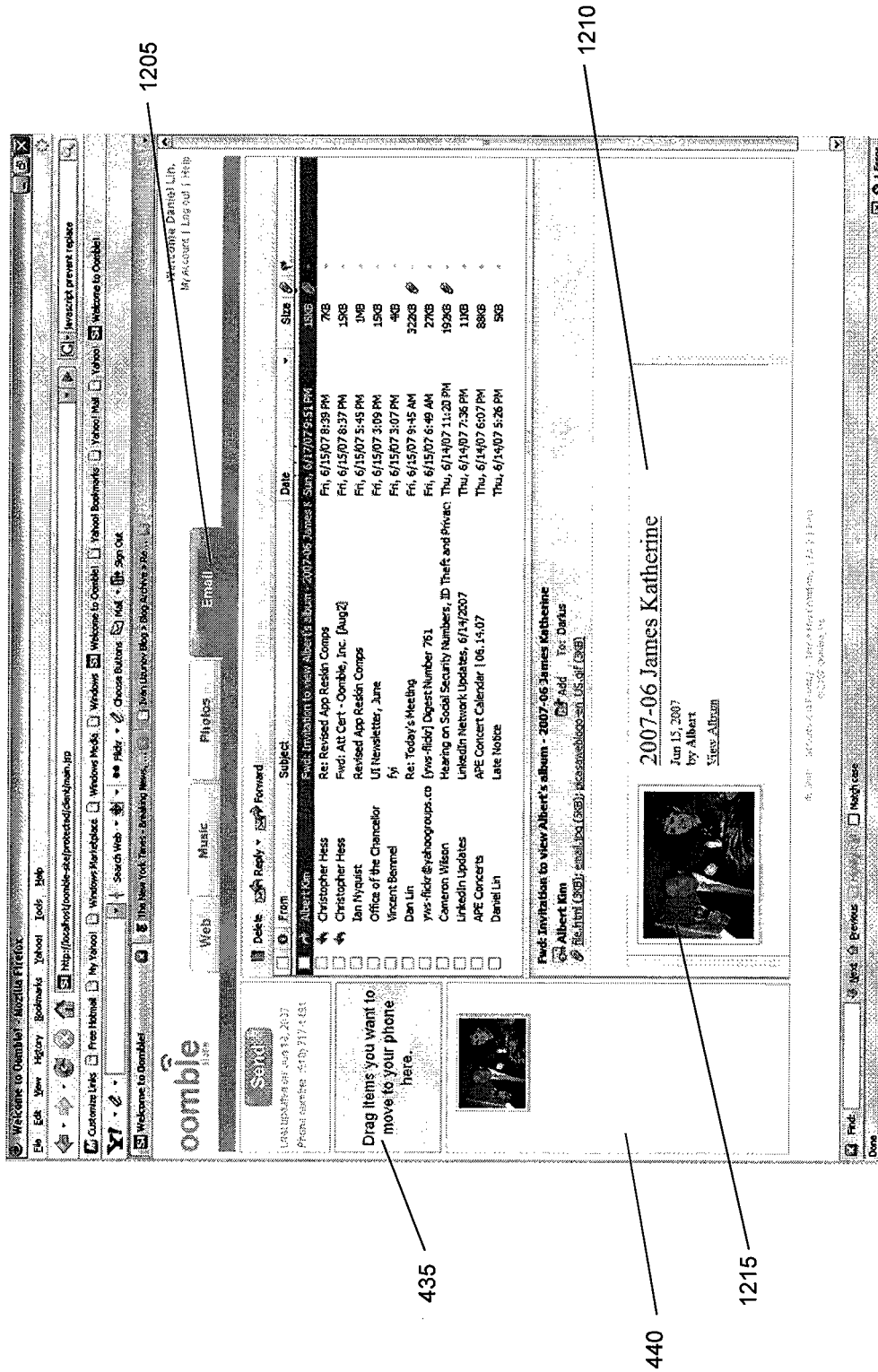
FIG. 12 depicts one exemplary embodiment for a user interface for dragging multimedia content in a user's emails into his cell phone.

Similarly, FIG. 12 depicts another exemplary embodiment with an "Email" tab panel 1205. In such an embodiment, a user may receive emails from third parties or forward his own emails from a different account to an email account managed at server 505. Such emails will appear in Email panel 1205 such that any multimedia content presented in email preview panel 1210 can be dragged into the drag and drop panel 435. For example, HTML encoded emails may be rendered appropriately in email preview panel 1210 and client side JavaScript code shall enable multimedia content such as 1215 to be dragged and staged in staging panel 440 for delivery to the user's cell phone. Similarly, multimedia content that is attached to an email as a MIME attachment may be extracted from the email, stored locally and rendered in Email panel 1205 to enable drag and drop of such content into drag and drop panel 435 for transfer to the user's cell phone.

E. Plugin Embodiment

In certain scenarios, the proxy servlet architecture as depicted in FIG. 5 and further detailed in FIGS. 6 and 7 may not render certain web pages properly in inline frame 430. For example, a web page from a third party web site may contain script code (such as JavaScript) that references script elements or functions embedded in the source code of the web page. Such script elements or functions may be referred to within the web page as being within the "top" level document of the DOM. When the web page is rendered at the third party web site, the web page is in fact the "top" level document and such script elements and functions can be located by the web browser. However, when such a web page is loaded into inline frame 430, the top level document of the DOM is page 405 itself and therefore, the script elements and functions referencing "top" within such loaded web page cannot be located because page 405 is the "top" level document rather the web page itself (which is embedded in the inline frame 430). Other web pages may intentionally include script code that will force the "top" level document to be page 405 itself such that the page cannot be rendered within an inline frame such as 430. Yet other pages, such as certain "login" web pages, utilize script code embedded in the page to specify to target web server 515 where to forward web browser 510, for example, once the user is logged in, as a parameter to the URL. Such dynamic generation of URLs and transmission of HTTP requests may impair the proxy methodology described in FIG. 7 (in particular, steps 705 to 720) and prevent proxy server 505 from interceding between the web browser 510 and the target web server 515. Specifically, because the click handler of step 705 cannot capture the proper URL as generated by the embedded JavaScript code of the web page, it may transmit an incorrect HTTP request to proxy server 505 which may not respond correctly.

To address such scenarios, a web browser plug-in may be developed and installed in accordance with the present invention. In an exemplary embodiment that utilizes the Microsoft Internet Explorer web browser (for example and without limitation), an ActiveX control plug-in may be developed to access the web browser's HTML parsing and rendering engine. Once installed in the web browser, the ActiveX control can be accessed by embedding a reference to the control in the web page source code. By providing a URL to the ActiveX control (via JavaScript, for example and without limitation), the ActiveX control can render a third party web page in place of inline frame 430 without suffering from the limitations of the proxy methodology as discussed above. Additionally, client-side JavaScript code can query the ActiveX control to access user events taken within the web page rendered by the ActiveX control and access the elements in the DOM of the page rendered by the ActiveX control. For example and without limitation, the ActiveX control may capture mouse events within the rendered web page and relay the events to the drag and drop capability implemented by JavaScript for processing. One exemplary embodiment of a plug-in in accordance with the present invention comprises at least (1) an HTML rendering component to render received URLs (e.g., received from portable script code such as JavaScript), (2) a mouse event capturing component to provide information regarding the source (e.g., HTML element) of drag events within the rendered URL, and (3) an interface component to enable portable script code (such as JavaScript) to query the plug-in for an HTML element associated with the drag source. While the foregoing plug-in embodiment has been depicted using ActiveX control and an Internet Explorer browser, those with ordinary skill in the art will recognize that any type of plug-in technology compatible with any type of web browser may be used without departing from the spirit of the described invention. Similarly, those with ordinary skill in the art will recognize that events other than mouse events (e.g., touch screen events, keyboard events, etc.) associated with user actions within the rendered web page may be captured by the plug-in in accordance with the present invention.

F. Integration with Parent Application

Those with ordinary skill in the art will further recognize that the teachings herein can be integrated with those teachings in the Parent Application. For example and without limitation, additional photo and music tabs similar to those discussed in the Parent Application can be added to the tab panels in an exemplary embodiment of the present invention where the delivery mechanism is the SMS delivery mechanism of FIGS. 9 and 10 rather than a thin client delivery mechanism. Similarly, an exemplary embodiment of a hosted management platform as described in the Parent Application can be enhanced to provide both the SMS delivery mechanism as well as the thin client delivery mechanism.

While the present invention has primarily utilized images as the primary example of multimedia content being dragged into cell phones, those of ordinary skill in the art will recognize that alternative media and embodiments may be implemented without departing from the spirit and scope of the claimed invention. As previously discussed, other forms of media and data such as video and music may also be transferred to a user's cell phone from the web in accordance with the techniques described herein. Similarly, while the present invention has been focused on cell phone, those with ordinary skill in the art will recognize the system and methods disclosed herein can also be applied to other networked mobile devices that have limited user interfaces, similar to cell phones. For example, a similar system may be implemented with respect to a mobile MP3 playing device (with cellular networking capability) in order to wirelessly transfer music found on the web onto such a device. Those of ordinary skill in the art will additionally recognize that the programmatic design decisions, client-server functionality and selected technologies and standards as described in the foregoing specification are merely illustrative and may be implemented in alternative but functionally equivalent designs and technologies without departing from the scope or spirit of the described embodiments. For example and without limitation, the present invention has been described using HTTP, JavaScript, servlet, cookie and WAP based technologies, but those of ordinary skill in the art will recognize that numerous other alternative web based technology choices may be made to achieve results consistent with the present invention. Terminology used in the foregoing description is for the purpose of describing the particular versions or embodiments only, and is not intended to limit the scope of the present invention which will be limited only by the appended claims. As used herein and in the appended claims, the singular forms "a," "an," and "the" include plural references unless the context clearly dictates otherwise. Similarly, the words "for example", "such as", "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A method for enabling delivery of content from web pages to a mobile device, the method comprising:
    providing web-based code to a website that, when incorporated into the code of the website and activated by a user of a user terminal viewing the website, causes an address of a web page displayed on a web browser at the user terminal to be extracted from the web browser and sent as part of a hypertext transfer protocol (HTTP) request;
    receiving, from the user terminal, the HTTP request comprising the address of the web page displayed on the web browser;
    redirecting the HTTP request to a host web page with an inline frame displaying the web page;
    receiving an action taken by the user that indicates a request to deliver an item of content displayed on the web page to the mobile device; and
    at least partially responsive to receiving the action, transmitting instructions to the mobile device to retrieve the item of content and store the item of content on the mobile device.

2. The method of claim 1, wherein transmitting instructions comprises transmitting a push message to the mobile device to wake up the module to retrieve the item of content.

3. The method of claim 1, wherein the web-based code is based at least in part on ECMAScript.

4. A non-transitory computer-readable storage medium including instructions that, when executed by a processor, causes a proxy server to perform acts comprising:

providing code to a website that, when activated by a user viewing a web page of the website, causes a universal resource locator (URL) of the web page to be transmitted to the proxy server;
receiving the URL of the web page;
generating a web user interface comprising a receiving panel associated with an account of the user on the proxy server and an embedded web browser within a web page;
providing the web page of the website for display in the embedded web browser; and
receiving an action taken by the user that indicates a request to deliver an item of content displayed on the web page of the website in the embedded web browser to a mobile device associated, at the proxy server, with the account of the user.

5. The non-transitory computer-readable storage medium of claim 4, wherein the code is activated by user selection of a link, a button, or a widget on the web page.

6. The non-transitory computer-readable storage medium of claim 4, wherein the action comprises dragging the item of multimedia content from the web page in the embedded web browser into the receiving panel.

7. A server configured to enable a user to deliver content available from web pages to a mobile device, the server comprising:
a processor configured to provide web-based code to a website to enable the website to send a hypertext transfer protocol (HTTP) request to the server, the request including an address of a web page that contains a content item which can be delivered to a user's mobile device;
a filter configured to listen for and identify the HTTP request when received at the server; and
a proxy service configured to redirect the HTTP request to a web server that hosts the web page and receive a response from the web server;
wherein the processor is further configured to:
present a web browser user interface that includes an embedded web browser displaying the web page received by the proxy service from the web server;
receive an action taken by the user in the web browser user interface that indicates a request to deliver the content item from the web page to the mobile device; and
transmit instructions to the mobile device to retrieve the content item from the server.

8. The method of claim 1, wherein transmitting instructions comprises transmitting a message to the mobile device that includes an address of a location where the item of content is stored.

9. The method of claim 1, wherein the web-based code, when incorporated into the code of a website, is activated by user selection of a link, button, or widget in the web page.

10. The method of claim 1, wherein the addresses of the web page is extracted from the web browser by script code on the user terminal.

11. The method of claim 1, wherein the HTTP request comprises an HTTP GET request.

12. The method of claim 1, further comprising extracting a user identifier from the HTTP request and associating the mobile device with the user.

13. The method of claim 1, wherein the host web page comprises a receiving panel and the action taken by the user comprises interacting with the receiving panel and the inline frame.

14. The non-transitory computer-readable storage medium of claim 4, wherein the acts further comprise:
prior to enabling delivery the item of content to the mobile device, accessing a profile of the website that indicates a fee structure for providing an item of content from the website; and
causing the user to be charged according to the fee structure for delivery of the item of content to the mobile device.

15. The non-transitory computer-readable storage medium of claim 4, wherein the acts further comprise:
prior to enabling delivery of the item of content to the mobile device, accessing a profile of the website that indicates items of content from the website that are blocked from being copied to mobile devices; and
when the item of content is indicated in the profile as being blocked, preventing transfer of the item of content to the mobile device.

16. The server of claim 7, wherein the web-based code comprises script code configured for execution by a web browser on a terminal accessed by the user.

17. The server of claim 7, wherein the proxy service is further configured to serve a Document Object Model (DOM) of the web page that includes source code for the content item in the web page.

18. The server of claim 7, wherein the web browser user interface additionally includes a receiving panel and the action taken by the user comprises identifying the content item based at least in part on an interaction with the content item in the embedded web browser and with the receiving panel.

19. The server of claim 18, wherein the interaction comprises dragging the content item from the embedded web browser to the receiving panel.

20. The server of claim 7, wherein the embedded web browser is presented in an inline frame of the web browser user interface.

* * * * *

UNITED STATES PATENT AND TRADEMARK OFFICE
CERTIFICATE OF CORRECTION

| | | |
|---|---|---|
| PATENT NO. | : 8,417,772 B2 | Page 1 of 1 |
| APPLICATION NO. | : 13/207234 | |
| DATED | : April 9, 2013 | |
| INVENTOR(S) | : Daniel J. Lin et al. | |

It is certified that error appears in the above-identified patent and that said Letters Patent is hereby corrected as shown below:

In the Specification:

Column 8, line 18, change "with" to --without--.

Signed and Sealed this
Tenth Day of September, 2013

Teresa Stanek Rea
*Acting Director of the United States Patent and Trademark Office*